US010427775B2

(12) United States Patent
Mores et al.

(10) Patent No.: US 10,427,775 B2
(45) Date of Patent: Oct. 1, 2019

(54) AIRCRAFT WITH A FUSELAGE THAT DEFINES AT LEAST AN INTERIOR REGION AND A DRIVE SYSTEM ACCOMMODATING REGION

(71) Applicant: AIRBUS HELICOPTERS DEUTSCHLAND GMBH, Donauworth (DE)

(72) Inventors: Sebastian Mores, Munich (DE); Frank Loeser, Kaisheim (DE); Johannes Frese, Kaisheim (DE); Ralf Braeutigam, Tapfheim (DE); Christian Wehle, Munich (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 86 days.

(21) Appl. No.: 15/043,758

(22) Filed: Feb. 15, 2016

(65) Prior Publication Data

US 2016/0236767 A1    Aug. 18, 2016

(30) Foreign Application Priority Data

Feb. 16, 2015    (EP) .................................... 15400008

(51) Int. Cl.
*B64C 1/40*    (2006.01)
*B64C 1/10*    (2006.01)
(Continued)

(52) U.S. Cl.
CPC .................. *B64C 1/40* (2013.01); *B64C 1/10* (2013.01); *B64C 1/16* (2013.01); *B64C 27/82* (2013.01);
(Continued)

(58) Field of Classification Search
CPC .... B64C 1/10; B64C 1/16; B64C 1/40; B64C 27/82; B64C 1/1476; B64C 1/32;
(Continued)

(56) References Cited

U.S. PATENT DOCUMENTS 2,322,715 A * 6/1943 Kloeren .................. B64C 27/24
244/17.19
2,369,652 A * 2/1945 Avery ..................... B64C 27/82
244/17.13
(Continued)

FOREIGN PATENT DOCUMENTS

DE    2164647    7/1973
EP    0524044    1/1993
(Continued)

OTHER PUBLICATIONS

European Search Report for European Application No. 15400008, Completed by the European Patent Office dated Jul. 24, 2015, 10 Pages.
(Continued)

*Primary Examiner* — Medhat Badawi
(74) *Attorney, Agent, or Firm* — Brooks Kushman P.C.

(57) ABSTRACT

An aircraft with a fuselage that defines at least an interior region and a drive system accommodating region, the drive system accommodating region being arranged inside the fuselage and comprising at least one fire protection zone that is defined by at least one associated firewall arrangement, the at least one fire protection zone accommodating at least one engine within the at least one associated firewall arrangement such that the associated firewall arrangement defines a fire-resistant separation between the at least one engine and the interior region of the fuselage, wherein the at least one associated firewall arrangement comprises at least one air duct for ducting a hot air flow that is generated in
(Continued)

operation of the aircraft independent from heat generation of the at least one engine.

19 Claims, 13 Drawing Sheets

(51) Int. Cl.
  *B64D 33/08* (2006.01)
  *B64C 1/16* (2006.01)
  *B64C 27/82* (2006.01)
  *B64D 33/04* (2006.01)
  *B64D 41/00* (2006.01)
(52) U.S. Cl.
  CPC ............. *B64D 33/04* (2013.01); *B64D 33/08* (2013.01); *B64D 41/00* (2013.01)
(58) Field of Classification Search
  CPC ... B64C 27/04; B64C 2025/325; B64C 21/00; B64C 2027/8245; B64D 25/00; B64D 25/10; B64D 33/04; B64D 33/08; B64D 41/00; B60R 202/0093; Y02T 50/166
  See application file for complete search history.

(56) References Cited

U.S. PATENT DOCUMENTS

| | | | | |
|---|---|---|---|---|
| 2,609,053 A * | 9/1952 | Lee | ......................... | B64C 27/82 415/121.3 |
| 3,957,230 A * | 5/1976 | Boucher | ................ | A63H 27/02 244/190 |
| 4,200,252 A * | 4/1980 | Logan | ..................... | B64C 27/82 244/130 |
| 4,216,924 A * | 8/1980 | Fradenburgh | ........... | B64C 21/00 244/17.11 |
| 4,295,130 A * | 10/1981 | Tai-Her | .................. | G08B 25/14 340/517 |
| 4,585,391 A * | 4/1986 | Vuillet | .................... | B64C 27/82 415/121.3 |
| 4,708,305 A * | 11/1987 | Kelley | .................... | B64C 23/00 244/17.19 |
| 5,240,205 A * | 8/1993 | Allongue | ................ | B64C 27/82 244/17.19 |
| 5,265,408 A * | 11/1993 | Sheoran | ................. | B64D 33/08 60/262 |
| 5,301,900 A * | 4/1994 | Groen | .................... | B64C 27/43 244/17.11 |
| 5,484,122 A * | 1/1996 | DeSalve | ................ | B64D 13/00 244/117 A |
| 5,649,678 A * | 7/1997 | Nurick | .................... | B64C 27/82 244/17.19 |
| 5,662,292 A * | 9/1997 | Greene | .................. | B64D 33/02 244/53 B |
| 5,836,545 A * | 11/1998 | Arlton | .................... | A63H 27/12 244/17.11 |
| 6,053,452 A * | 4/2000 | Yamakawa | ............. | B64C 13/16 244/17.19 |
| 6,138,949 A * | 10/2000 | Manende | .................. | B64C 1/00 244/119 |
| 6,161,798 A * | 12/2000 | Van Sise, Jr. | .......... | B64D 25/00 244/1 R |
| 6,247,668 B1 * | 6/2001 | Reysa | .................... | B64D 41/00 244/53 B |
| 6,352,220 B1 * | 3/2002 | Banks | ..................... | B64C 27/82 244/12.5 |
| 6,416,015 B1 * | 7/2002 | Carson | .................... | B64C 27/82 244/17.19 |
| 7,032,860 B1 * | 4/2006 | Kirk | ...................... | B64C 27/006 244/17.15 |
| 8,196,855 B2 * | 6/2012 | Balkus, Jr. | ............ | B64C 27/006 244/17.11 |
| 8,336,808 B2 * | 12/2012 | Challis | .................... | B64C 27/22 244/17.11 |
| 8,473,189 B2 * | 6/2013 | Christoph | ............. | B64C 27/006 244/17.11 |
| 8,561,938 B2 * | 10/2013 | Dickman | ................ | B64C 27/82 244/17.13 |
| 8,939,395 B2 * | 1/2015 | Yarger | ................... | B64C 27/025 244/17.11 |
| 9,409,643 B2 * | 8/2016 | Mores | ..................... | B64C 27/06 |
| 9,452,832 B2 * | 9/2016 | Heid | ....................... | B64C 27/82 |
| 9,574,497 B2 * | 2/2017 | Dailey | ...................... | F02C 7/04 |
| 9,725,164 B2 * | 8/2017 | Kelaidis | .................. | B64C 13/16 |
| 2003/0080244 A1 * | 5/2003 | Dionne | ................... | B64D 33/08 244/57 |
| 2004/0060278 A1 * | 4/2004 | Dionne | .................. | B64D 33/08 60/39.83 |
| 2007/0063098 A1 * | 3/2007 | Dionne | .................. | B64D 33/08 244/57 |
| 2008/0245062 A1 * | 10/2008 | Dionne | .................. | B64D 33/08 60/320 |
| 2009/0134276 A1 * | 5/2009 | Chaniot | .................... | B64C 1/10 244/129.2 |
| 2010/0230530 A1 * | 9/2010 | Nannoni | .................. | B64D 7/08 244/17.11 |
| 2011/0259998 A1 * | 10/2011 | Sanz Mart Nez | ...... | B64C 1/068 244/54 |
| 2012/0318913 A1 * | 12/2012 | Filho | ..................... | B64D 41/00 244/58 |
| 2013/0221153 A1 * | 8/2013 | Worsham, II | ......... | B64C 27/006 244/17.13 |
| 2016/0236767 A1 * | 8/2016 | Mores | ....................... | B64C 1/10 |
| 2017/0167383 A1 * | 6/2017 | Brown | .................... | F04D 17/16 |

FOREIGN PATENT DOCUMENTS

| | | |
|---|---|---|
| EP | 1069044 A2 | 1/2001 |
| EP | 1069044 A3 | 11/2003 |
| EP | 2535274 | 12/2012 |
| FR | 2905358 | 3/2008 |
| GB | 2044359 | 10/1980 |
| JP | 2009298399 A | 12/2009 |
| WO | 9316280 | 8/1993 |
| WO | 03037715 | 5/2003 |

OTHER PUBLICATIONS

Japanese Office Action for Japanese Application No. 2016-011671, dated Dec. 14, 2016, 2 Pages.

* cited by examiner

AIRCRAFT WITH A FUSELAGE THAT DEFINES AT LEAST AN INTERIOR REGION AND A DRIVE SYSTEM ACCOMMODATING REGION

CROSS REFERENCE TO RELATED APPLICATION

This application claims priority to European patent application No. EP 15 400008.7 filed Feb. 16, 2015, the disclosure of which is incorporated in its entirety by reference herein.

BACKGROUND OF THE INVENTION (1) Field of the Invention

The invention is related to an aircraft with a fuselage that defines at least an interior region and a drive system accommodating region, said aircraft comprising the features of claim 1.

(2) Description of Related Art

A fuselage of an aircraft, and in particular of a rotary-wing aircraft, generally defines an interior region and a drive system accommodating region that is arranged inside the fuselage. The interior region usually comprises at least a cockpit and may further comprise a cabin for passengers and/or cargo. The drive system accommodating region usually accommodates one or more engines that are adapted for driving the aircraft, e.g. by providing power to an associated power distribution unit, such as a gearbox, which then provides this power to a suitable propelling unit, such as e.g. a propeller, rotor or other.

Typically, the one or more engines are embodied as air breathing propulsion engines, such as diesel engines, gas engines, gas turbines and so on, which combust a fuel/air mix for power generation. In operation, all such air breathing propulsion engines need fresh air, ideally cold air, which is mixed with fuel so that these engines perform sufficiently and satisfactorily.

However, all such air breathing propulsion engines will not only generate power in operation, but also heat that must be dissipated from the engines for preventing an overheating thereof, which is crucial for the entire aircraft performance, safety and reliability. Usually, such dissipation is conducted using air that cools oil, which in turn cools an associated engine. A corresponding heat transfer from the oil to the air is frequently conducted by means of one or more oil coolers, which are propelled mechanically by the associated engine, a gearbox or electrical engines with sufficient cooling power.

In the latter case, the gearbox and/or the electrical engines also generate heat that is usually likewise transferred to oil, which dissipates the transferred heat by an air flow through one or more suitable oil coolers. However, as space and volume is generally limited in an aircraft, the engines and oil coolers, as well as other cooling devices, air intakes and/or heating or heat dissipating surfaces are commonly positioned comparatively close to each other, so that they may nevertheless affect each other thermally.

More specifically, all aircrafts currently use oil coolers and/or other cooling devices, so that an adequate working environment must be provided for these oil coolers and/or cooling devices, wherein hot air resulting from respectively generated heat is ideally transferred to surrounding ambient air. Such hot air coming from the oil coolers and/or cooling devices may have one of the following origins, which are not necessarily implemented or provided on each aircraft:

cooling of engine oil,
the surface of a main gearbox,
cooling of main gearbox oil,
a starter/generator of an engine,
other electrical engines,
auxiliary gearboxes mounted on the engines or the main gearbox,
hydraulic pumps for actuating an underlying dynamic system (e.g. swash plate), and/or
heat exchangers of an air conditioning system.

If hot air coming from the oil coolers and/or other cooling devices warms up the fresh air that is mixed with the fuel for combustion in the above mentioned air breathing propulsion engines, a resulting air temperature will be higher than an original air temperature of the fresh air, thereby leading to a reduced engine performance in general. This occurs mainly if the hot air is expelled in a region of the aircraft that is located upstream of corresponding fresh air intakes of the air breathing propulsion engines.

Therefore, in order to avoid such a mixing, the fresh air intakes of aircrafts that are used for engine operation, or oil cooling and/or air conditioning purposes, are ideally located upfront the aircraft and corresponding hot air emitted from the oil coolers, engines and other auxiliary devices is ideally expelled at the rear of the aircraft. Thus, reinjection can be avoided and use under pressure for amplification can be enabled. This is, however, not a simple task to fulfil due to limited space, weight, architectures, etc. of aircrafts in general.

The document US20090134276 describes an aircraft with two compartments that are separated by two distinct walls of an associated firewall arrangement, which are spaced apart from each other to form an interior air duct channel. Between these two walls, a fresh air flow is ducted for cooling at least a first one of the two walls that closes up the first compartment, which accommodates e.g. a gearbox. Consequently, the first compartment is also cooled. Furthermore, the fresh air flow is ducted via an associated air duct that passes through the second one of the two walls into a gas turbine exhaust of a turboshaft engine, both of which are arranged within the second compartment, for reducing a respective gas turbine exhaust temperature in the gas turbine exhaust. However, this firewall arrangement requires a comparatively great space for installation in an area of the aircraft, where the available space is already limited, as described above.

The document U.S. Pat. No. 4,216,924 describes an aircraft in the form of a helicopter that is provided with a low drag canopy, which comprises exhaust nozzles and vents for reducing a drag occurring in operation by increasing a respective energy of the helicopter's boundary layer. The helicopter is provided with a cooling structure that is adapted for cooling the helicopter's engines and lubricating oil thereof. However, management of any hot air flow other than the one that is generated in operation of this helicopter by the engines and/or the lubricating oil respectively corresponding oil coolers, e.g. a hot air flow generated in an unfavorable warm upfront positioned region such as the main gearbox region of the helicopter, is not described. In other words, it is not described how such a hot air flow can be ducted from the unfavorable upfront positioned region to the favorable aft region of the helicopter.

Other prior art documents have been considered. The document EP2535274 describes an airliner with a tail cone housing a pair of auxiliary power and thrust unit (APTU). The APTUs adjacently are mounted in parallel relative to one another within the tail cone section. The embodiment of FIG. 3 is provided with a firewall plate positioned between the APUs, in the form of a generally U-shaped plate structure having downwardly directed lateral edge regions. An upper frame member may be attached generally at a center of the firewall plate.

The document WO9316280 describes an airliner auxiliary power unit. An eductor comprises an annular mixer nozzle receiving a flow of high velocity gas. A housing defines a first annular plenum and a second nozzle receiving the venting air from said plenum.

The document WO03037715 describes a passive cooling system for an auxiliary power unit installation on an airliner. The system comprises an auxiliary power unit housed within a nacelle. An oil cooler is contained separately within the nacelle Furthermore, in the above described aircrafts all corresponding aft regions are usually provided with comparatively heavy heat protection layers, which are commonly used on aircrafts to protect the aft regions against hot air flows. Moreover, such aircrafts are frequently subject to hot gas reinjections resulting from main engine exhausts and/or any secondary hot exhaust gases produced by auxiliary devices.

BRIEF SUMMARY OF THE INVENTION

It is, therefore, an object of the present invention to provide a new aircraft with an improved hot air management and dissipation system.

This object is solved by an aircraft with a fuselage that defines at least an interior region and a drive system accommodating region, said aircraft comprising the features of claim 1.

More specifically, according to the present invention an aircraft with a fuselage that defines at least an interior region and a drive system accommodating region is provided. The drive system accommodating region is arranged inside the fuselage and comprises at least one fire protection zone that is defined by at least one associated firewall arrangement. The at least one fire protection zone accommodates at least one engine within the at least one associated firewall arrangement such that the at least one associated firewall arrangement defines a fire-resistant separation between the at least one engine and the interior region of the fuselage. The at least one associated firewall arrangement comprises at least one air duct for ducting a hot air flow that is generated in operation of the aircraft independent from heat generation of the at least one engine.

According to one aspect of the present invention, the at least one engine is an air breathing propulsion engine and the aircraft is provided with the at least one associated firewall arrangement in order to separate the engine from the rest of the aircraft and to protect the at least one interior region of the fuselage in case of a fire of the air breathing propulsion engine. It should be noted that all aircrafts with air breathing propulsion engines generally comprise suitable firewall arrangements integrated into the aircrafts, due to safety regulations.

Preferably, the at least one firewall arrangement comprises one or more fire protection walls, which are preferentially as small and as light-weight as possible in order to reduce a required amount of fire extinguishing agents as far as possible. However, they are preferably still large enough for providing a required cooling performance for the at least one engine and/or corresponding engine auxiliaries.

Advantageously, the one or more fire protection walls are positioned all around the at least one engine, thus protecting the rest of the aircraft. In the case of a rotary-wing aircraft, the at least one engine and, more particularly at least one main engine, is usually arranged behind a respective main rotor and main gearbox of the rotary-wing aircraft, seen in forward flight direction of the rotary-wing aircraft. Thus, expelling hot air in the region of this main engine in operation is favorable since this region is designed for impacting hot air. For instance, this region is usually provided with a suitable thermal protection and sufficiently spaced apart from fresh air intakes of the main engine, etc. In contrast hereto, the above mentioned oil coolers and other cooling devices are usually at least essentially positioned upstream of the at least one main engine, seen in the forward flight direction of the rotary-wing aircraft, i.e. in the front region of the rotary-wing aircraft. Thus, hot air generated by these oil coolers and other cooling devices would usually be expelled in the front region, i.e. upstream of the fresh air intakes of the main engine.

However, as already explained above, expelling the hot air upfront the fresh air intakes leads to major performance problems, as the hot air enters the main engine and leads to a reduction of its overall performance. Consequently, since the main engine and, more generally, all air breathing propulsion engines are sensitive with respect to re-ingesting such hot air or even their own expelled hot air and/or gases, a basic principle of the present invention consists in providing a structure that is configured for dividing intake regions for fresh cold air from exhaust regions for hot air, wherein the intake regions are preferably arranged in a front portion of the aircraft and wherein the exhaust regions are preferably arranged in an aft region of the aircraft. Thus, all parts that need fresh cold air, such as the air breathing propulsion engines, blowers, fans etc., receive this fresh cold air upfront of the air breathing propulsion engines and all produced hot air will be expelled at a preferably far most aft region behind the engines.

According to the present invention, at least one of the fire protection walls is provided with one or more air ducts, which are preferably integrated into the at least one of the fire protection walls and adapted for collecting preferentially all hot air produced by auxiliary devices, such as oil coolers and other cooling devices that are located in the drive system accommodating region, in order to lead the collected hot air preferably beneath an associated cowling of the aircraft to the aft of the aircraft, to a region where hot air generated by the main engine itself is expelled. The one or more air ducts can be fully integrated ducts, i.e. integral part of one or more of the fire protection walls, with a shape and cross-section that is preferentially adapted to the demands of respective heat generating devices, e.g. with respect to massflow rate, heat resistance, etc., or may be structural provisions in the one or more fire protection walls that are adapted for accommodating one or more separate hoses and/or ducts.

According to one aspect of the present invention, hot air generated from a multiplicity of heat generating devices is collected. This collected hot air builds up a massflow of hot air, which can be a significant massflow of several kg/s and which can advantageously be used for protecting parts of the aircraft which are e.g. located close to a given main engine exhaust. Preferably, the massflow of hot air is expelled in the vicinity of the parts to be protected such that main engine exhaust gases coming from the main engine exhaust are kept away from these parts.

More specifically, a protective layer of hot air is preferably generated on the parts to be protected such that all near-engine zones are protected. It should be noted that dependent on the used main engine(s), the main engine exhaust gases may reach temperatures of up to 500 to 700°

C., which is unfavorable in any case when hitting aircraft parts in general, and when hitting the parts to be protected in particular. In contrast, the massflow of hot air and, thus, the inventive protective layer of hot air will have temperatures which any structure/cowling and/or weathering of metal or fiber can withstand.

Advantageously, due to the expelling of the massflow of hot air, a positive influence of a surface-near airflow alongside the aircraft, specifically in the boundary layer, can be achieved. More specifically, in a rotary-wing aircraft the boundary layer in a corresponding cowling and tail boom region commonly has low energy, which may lead, depending on the surface shape and flight condition, to a flow separation. This separation in turn leads to a phenomenon called "tail-shake" and is very unfavorable. Due to the massflow of hot air, this boundary layer is ignited with additional energy leading to a reduced tail-shake risk. Additionally the drag of the aircraft is reduced thereby. Furthermore, depending on a selected shape of corresponding secondary exhaust nozzles for expelling the massflow of hot air, the massflow of hot air will also lead to a certain amount of thrust, which may be useful for efficient forward flight.

According to a preferred embodiment, the at least one air duct is integrated into the at least one associated firewall arrangement.

Thus, the hot air produced by any heat generating device can easily be directed into a favorable region of the aircraft. Advantageously, the integrated air duct is at least essentially weight neutral, meaning that no additional weight is neither introduced nor needed, as it is an integral part of the at least one associated firewall arrangement. Additionally, integrating the at least one air duct into the at least one associated firewall arrangement enables provision of smaller fire zone volumes, thus reducing a required amount of fire extinguishing agents necessary to extinguish fire.

According to one aspect of the present invention, the integrated air duct advantageously uses the so-called Venturi effect which creates suction for hot regions surrounding the integrated air duct, which do not have a dedicated cooling device, such as e.g. a main gearbox zone of the drive system accommodating region in a rotary-wing aircraft. Thereby, an improved cooling performance of the drive system accommodating region in the rotary-wing aircraft can be achieved during hovering condition due to forced convection.

According to a further preferred embodiment, at least one gearbox and/or at least one auxiliary device are provided that generate the hot air flow in operation.

According to a further preferred embodiment, the at least one engine is an air breathing propulsion engine that generates a primary hot air flow in operation. The primary hot air flow is ducted independent of the hot air flow.

According to a further preferred embodiment, the at least one associated firewall arrangement defines a first fire protection zone accommodating a first engine and a second fire protection zone accommodating a second engine. The at least one air duct is arranged between the first and second fire protection zones.

According to a further preferred embodiment, the at least one associated firewall arrangement defines a component receiving compartment between the first and second fire protection zones.

According to a further preferred embodiment, the drive system accommodating region defines an upper deck region of the fuselage. The upper deck region is arranged inside the fuselage adjacent to an upper fuselage side.

According to a further preferred embodiment, the aircraft is implemented as a rotary-wing aircraft with at least one main rotor that is drivingly coupled to the at least one engine.

According to a further preferred embodiment, at least one counter-torque device is provided. The counter-torque device is drivingly coupled to an associated drive shaft. The associated drive shaft is at least partly received in the component receiving compartment.

According to a further preferred embodiment, the fuselage defines a tail boom, wherein at least one primary exhaust nozzle is provided for expelling a primary hot air flow generated by the at least one engine in operation. The at least one air duct is provided with at least one auxiliary exhaust nozzle for expelling the hot air flow in operation. The at least one auxiliary exhaust nozzle is at least partly arranged between the at least one primary exhaust nozzle and the tail boom.

Advantageously, the at least one air duct collects hot air from several heat generating devices and expels it in a specific, favorable aft region of the aircraft. As different heat generating devices generate hot air with different temperatures, an overall temperature of the collected hot air will approximately amount to less than 120° C. and, thus, be lower than a maximum temperature of the hottest separate hot air flow. Furthermore, since the collected hot air is expelled in an aft placed region of the aircraft, the fresh air intakes of the at least one engine, which is advantageously positioned comparatively far upstream, will not re-ingest expelled hot air, so that power losses can advantageously be prevented. Also, this positioning of the fresh air intakes will advantageously at least reduce the risk of re-ingesting hot gases expelled by any auxiliary device, such as e.g. a gearbox oil cooler, engine oil cooler and so on.

According to a further preferred embodiment, the fuselage defines a tail boom, wherein the hot air flow is expelled through the tail boom in operation.

According to a further preferred embodiment, the at least one air duct is provided with at least one exhaust nozzle through which the hot air flow is expelled in operation. The at least one exhaust nozzle is adapted for directing an expelled hot air flow at least partly alongside the fuselage.

Thus, the aft region of the aircraft is protected by the expelled hot air flow, which advantageously avoids that hotter main exhaust gases hit the fuselage in the aft region. Furthermore, due to the expelled hot air flow which protects the aft region, the at least one primary exhaust nozzle that is provided for expelling a primary exhaust air flow respectively a primary hot air flow generated by the at least one engine in operation may be less cambered, meaning that the primary hot air flow can be directed more in parallel to a longitudinal axis of the aircraft compared to conventional aircrafts, thus leading to less engine performance losses and to a further reduction of the risk of hot gas reinjection.

According to a further preferred embodiment, at least one primary exhaust nozzle is provided for expelling a primary exhaust air flow respectively a primary hot air flow generated by the at least one engine in operation. The at least one air duct is provided with at least one auxiliary exhaust nozzle for expelling the hot air flow in operation. The at least one auxiliary exhaust nozzle is at least partly integrated into the at least one primary exhaust nozzle.

Thus, the hot air flow can advantageously redirect the primary exhaust air flow in operation, so that the risk of re-ingestion is reduced during flight.

According to a further preferred embodiment, the at least one air duct accommodates at least one hot-air hose for ducting the hot air flow.

According to a further preferred embodiment, the at least one air duct comprises thermally insulated material.

According to a further preferred embodiment, the at least one associated firewall arrangement defines a first fire protection zone accommodating a first engine and a second fire protection zone accommodating a second engine. The at least one air duct comprises a first air duct arranged in the first fire protection zone and a second air duct arranged in the second fire protection zone.

According to a further preferred embodiment, the at least one air duct is defined by associated air duct walls that separate, in operation, the hot air flow from the at least one fire protection zone.

According to a further preferred embodiment, the associated air duct walls comprise at least one air duct wall that separates, in operation, the hot air flow from the fuselage.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
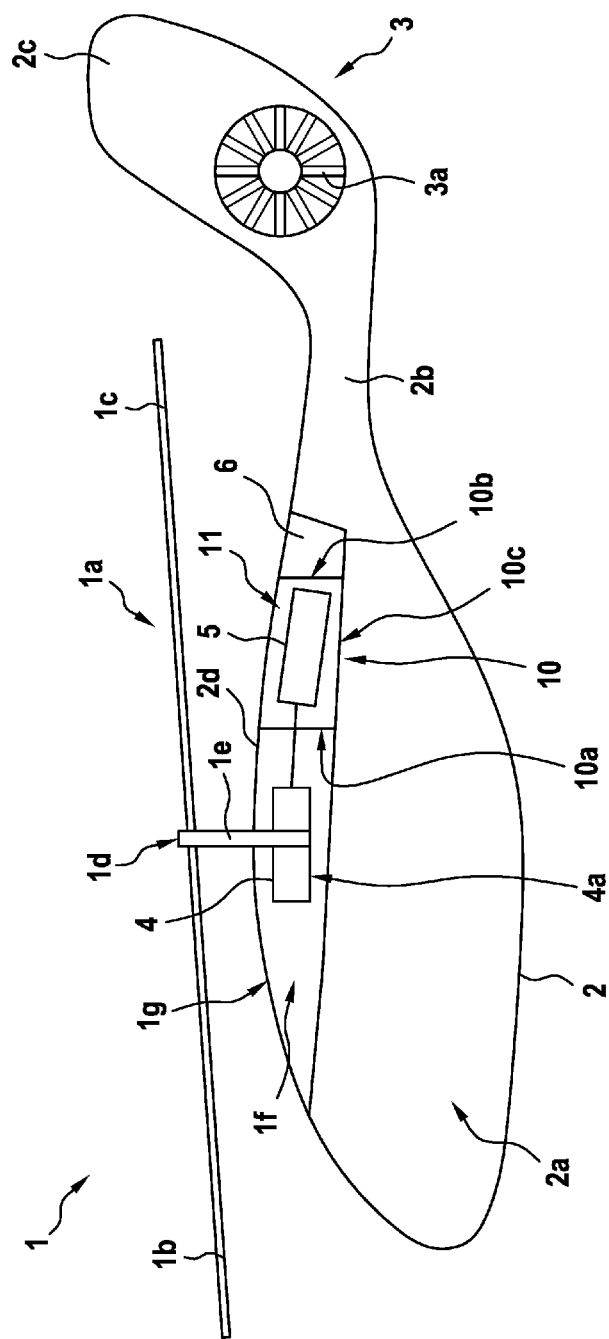
FIG. 1 shows a schematic side view of an aircraft with a fuselage that defines at least an interior region and a drive system accommodating region with a firewall arrangement according to the present invention.

FIG. 1 shows an aircraft 1, which comprises a fuselage 2 that defines at least an interior region 2a and a drive system accommodating region 1f according to one aspect of the present invention. The aircraft 1 is exemplarily embodied as a rotary-wing aircraft and, in particular, as a helicopter. Therefore, the aircraft 1 is also referred to hereinafter as the "helicopter 1" for simplicity and clarity. It should, however, be noted that the present invention is not limited to helicopters and can likewise be applied to other aircrafts having a fuselage that defines at least an interior region and a drive system accommodating region according to the present invention.

Illustratively, the fuselage 2 further defines an outer surface 1g of the aircraft 1 and at least one tail boom 2b, but may moreover define a cockpit, as well as a passenger cabin and/or a cargo compartment. However, for simplicity and clarity of the drawings, such a cockpit, passenger cabin and cargo compartment are not shown and explained in greater detail.

The helicopter 1 illustratively comprises at least one main rotor 1a for providing lift and forward or backward thrust during operation. The at least one main rotor 1a is preferably drivingly coupled to at least one engine 5 and preferentially embodied as a multi-blade rotor. The latter exemplarily comprises a plurality of rotor blades 1b, 1c that are mounted at an associated rotor head 1d to a rotor shaft 1e, which rotates in operation of the helicopter 1 around an associated rotor axis. Preferably, the rotor shaft 1e is drivingly connected to a main gearbox 4 of the helicopter 1, which is also preferably drivingly connected to the at least one engine 5, both of which are preferentially arranged in the drive system accommodating region 1f.

According to one aspect of the present invention, the at least one engine 5 implements a main engine of the helicopter 1 and is therefore also referred to as the "main engine 5" hereinafter, for simplicity and clarity. Preferably, this main engine 5 is embodied as an air breathing propulsion engine, such as e.g. a diesel engine, gas engine, gas turbine and so on. It should, however, be noted that the present invention is not limited to such an implementation of the helicopter's main engine, which is merely described for purposes of illustration and explanation, and that the at least one engine 5 may also implement e.g. a supplementary engine instead of a main engine.

Preferably, at least one primary exhaust nozzle 6 is provided for expelling primary hot air (7 in FIG. 2) generated by the main engine 5 in operation. This at least one primary exhaust nozzle is illustratively located in the vicinity of the tail boom 2a.

Furthermore, the helicopter 1 may comprise one or more counter-torque devices configured to provide counter-torque during operation, i.e. to counter the torque created by rotation of the at least one main rotor 1a for purposes of balancing the helicopter 1 in terms of yaw. By way of example, a counter-torque device 3 with a tail rotor 3a is provided in the region of a fin 2c embodied at the tail boom 2a, which may further be provided e.g. with a horizontal stabilizer, a bumper and/or a tail wing embodied by or attached to the fuselage 2.

As already described above, the fuselage 2 defines the drive system accommodating region 1f, which is preferably arranged inside the fuselage 2. More specifically, the drive system accommodating region 1f defines an upper deck region of the fuselage 2, which is arranged inside the fuselage 2 adjacent to an upper fuselage side 2d thereof. Illustratively, the upper fuselage side 2d is a side of the fuselage 2 that faces the plurality of rotor blades 1b, 1c. Accordingly, for simplicity and clarity, the drive system accommodating region 1f is also referred to as the "upper deck region 1f" hereinafter.

According to one aspect of the present invention, the upper deck region 1f comprises at least one fire protection zone 11 that is defined by at least one firewall arrangement 10. This at least one fire protection zone 11 preferably accommodates the main engine 5 within the at least one firewall arrangement 10 such that the at least one firewall arrangement 10 defines a fire-resistant separation between the main engine 5 and the interior region 2a of the fuselage 2. Therefore, the at least one firewall arrangement 10 comprises a plurality of preferably interconnected fire protection walls 10a, 10b, 10c (and 10d in FIG. 2) that delimit the at least one fire protection zone 11. By way of example, and seen in a forward flight direction of the helicopter 1, the fire protection wall 10a defines a front fire protection wall, the fire protection wall 10b defines a rear fire protection wall, the fire protection wall 10c defines a lower fire protection wall and the fire protection wall 10d in FIG. 2 defines a middle fire protection wall.

Figure 2:
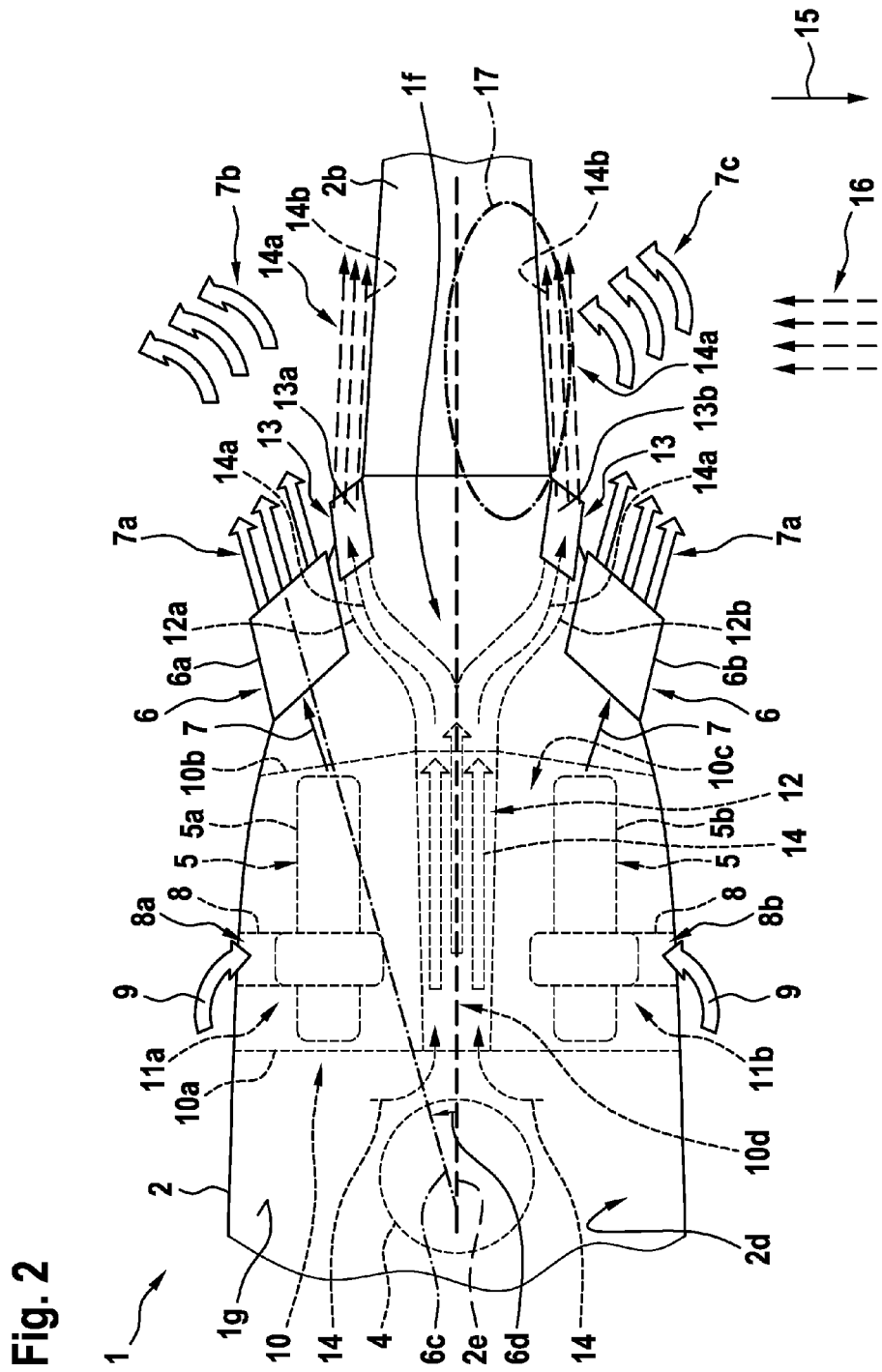
FIG. 2 shows a schematic top view of the drive system accommodating region with the firewall arrangement of FIG. 1.

FIG. 2 shows a section of the helicopter 1 of FIG. 1 having the main engine 5 and the fuselage 2 that defines the upper deck region 1f, which comprises the at least one firewall arrangement 10, and the tail boom 2b, seen in plan view on the upper fuselage side 2d. According to the present invention, the at least one firewall arrangement 10 comprises at least one air duct 12 for ducting auxiliary hot air 14 that is generated in operation of the helicopter 1 independent from heat generation of the main engine 5. Therefore, for simplicity and clarity, the at least one air duct 12 is also referred to hereinafter as the "hot air duct 12".

Preferably, the hot air duct 12 is integrated into the at least one firewall arrangement 10, i.e. implemented as an integral part thereof. Furthermore, the hot air duct 12 preferentially comprises thermally insulated material. Moreover, the hot air duct 12 is preferably tunnel- or gutter-shaped and arranged adjacent to the upper fuselage side 2d.

According to one aspect of the present invention, the main engine 5 is implemented by first and second main engines 5a, 5b. The latter are preferably both implemented as air breathing propulsion engines that are provided with associated main engine air intakes 8 for intake of respective fresh air flows 9 and with the primary exhaust nozzle 6 for expelling the primary hot air 7. More specifically, the first main engine 5a is illustratively provided with a first air intake 8a and a first primary exhaust nozzle 6a, and the second main engine 5b with a second air intake 8b and a second primary exhaust nozzle 6b.

The first primary exhaust nozzle 6a is preferably arranged on the fuselage 2 in the vicinity of the tail boom 2b. A mid axis 6c of this first primary exhaust nozzle 6a defines an inclination angle 6d with respect to a vertical mid plane 2e of the fuselage 2, which represents a longitudinal axis of the tail boom 2b. This inclination angle 6d is at least reduced compared to conventional configurations, is preferentially not greater than 30° and amounts illustratively to approximately 15°. More specifically, the inclination angle 6d defines a direction, into which a primary exhaust air flow 7a is expelled via the first primary exhaust nozzle 6a, and similarly via the second primary exhaust nozzle 6b. The second primary exhaust nozzle 6b is preferably similarly arranged and configured in an axially symmetrical manner with respect to the vertical mid plane 2e.

According to one aspect of the present invention, the first and second main engines 5a, 5b are accommodated in the at least one firewall arrangement 10. More specifically, the at least one firewall arrangement 10 preferably defines a first fire protection zone 11a, wherein the first main engine 5a is accommodated, and a second fire protection zone 11b, wherein the second main engine 5b is accommodated. The first and second fire protection zones 11a, 11b are preferably embodied by the fire protection walls 10a, 10b, 10c, 10d, wherein the middle fire protection wall 10d divides the at least one firewall arrangement 10 into the first and second fire protection zones 11a, 11b. Between the first and second fire protection zones 11a, 11b, the hot air duct 12 for ducting the auxiliary hot air 14 is preferentially arranged. This auxiliary hot air 14 is preferably ducted independent of the primary hot air 7 that is generated by the first and second main engines 5a, 5b.

In one embodiment, the auxiliary hot air 14 is at least partly generated by the main gearbox 4 and ducted via the hot air duct 12, which is illustratively provided with first and second additional hot air ducts 12a, 12b, towards auxiliary air exhaust nozzles 13. By way of example, the first additional hot air duct 12a is provided with a first auxiliary air exhaust nozzle 13a for expelling an auxiliary hot air flow 14a, and the second additional hot air duct 12b is provided with a second auxiliary air exhaust nozzle 13b for expelling the auxiliary hot air flow 14a. The auxiliary air exhaust nozzles 13 preferably comprise an arbitrary shape with a cross section that is adapted to a corresponding exiting velocity in order to minimize pressure losses.

According to one aspect of the present invention, at least one of the auxiliary air exhaust nozzles 13a, 13b is at least partly arranged between an associated one of the primary exhaust nozzles 6a, 6b and the tail boom 2b. Preferably, the auxiliary air exhaust nozzles 13a, 13b are located in a region of low aerodynamic pressure in order to create a suction effect, hence improving cooling performance during forward flight conditions of the helicopter 1.

Illustratively, the auxiliary air exhaust nozzle 13a is arranged between the primary exhaust nozzle 6a and the tail boom 2b and the auxiliary air exhaust nozzle 13b is arranged between the primary exhaust nozzle 6b and the tail boom 2b. Preferably, at least one of the auxiliary air exhaust nozzles 13a, 13b, through which the auxiliary hot air flow 14a is expelled in operation, is adapted for directing the expelled auxiliary hot air flow 14a at least partly alongside the fuselage 2 and, in particular, alongside the tail boom 2b, for creating a tail boom protective air flow 14b.

In operation of the aircraft 1, 1f the latter is e.g. flying into a sideward flight direction illustrated with an arrow 15, a surrounding air flow 16 occurs, which redirects the primary exhaust air flow 7a that is expelled via the first primary exhaust nozzle 6a in a direction opposed to the tail boom 2b, as indicated with arrows 7b, while the primary exhaust air flow 7a expelled via the second primary exhaust nozzle 6b is redirected towards the tail boom 2b, as indicated with arrows 7c. The arrows 7b, 7c are hereinafter referred to as the "deflected primary hot air flows" 7b, 7c, for brevity and simplicity.

The deflected primary hot air flow 7b streams away from the helicopter 1 and, thus, does not affect the underlying structure of the latter. In contrast thereto, the deflected primary hot air flow 7c streams towards the tail boom 2b and would normally heat up the tail boom 2b in a zone 17, which could at least potentially affect the underlying structure of the tail boom 2b due to the comparatively high temperatures of the deflected primary hot air flow 7c. However, the tail boom protective air flow 14b counteracts the deflected primary hot air flow 7c by pushing against the latter and by getting mixed with it, so that only a mixed air flow hits the tail boom 2b in the zone 17 with a temperature of approximately 120° C. that is lower than the temperature of the deflected primary hot air flow 7c.

It should be noted that generation of the tail boom protective air flow 14b is particularly advantageous if the tail boom 2b comprises fiber reinforced plastics in the zone 17 and as the tail boom 2b generally defines a structure whose function must not fail in case of an incident. Furthermore, it should be noted that depending on the design of the auxiliary air exhaust nozzles 13a, 13b, the tail boom protective air flow 14b will also lead to a reduced drag in the zone 17 as well as to a reduced overall drag of the helicopter 1, since it increases the energy of the aerodynamic boundary layer. This is commonly known as an "active boundary layer treatment". Due to this, an underlying tail-shake risk can be reduced.

Figure 3:
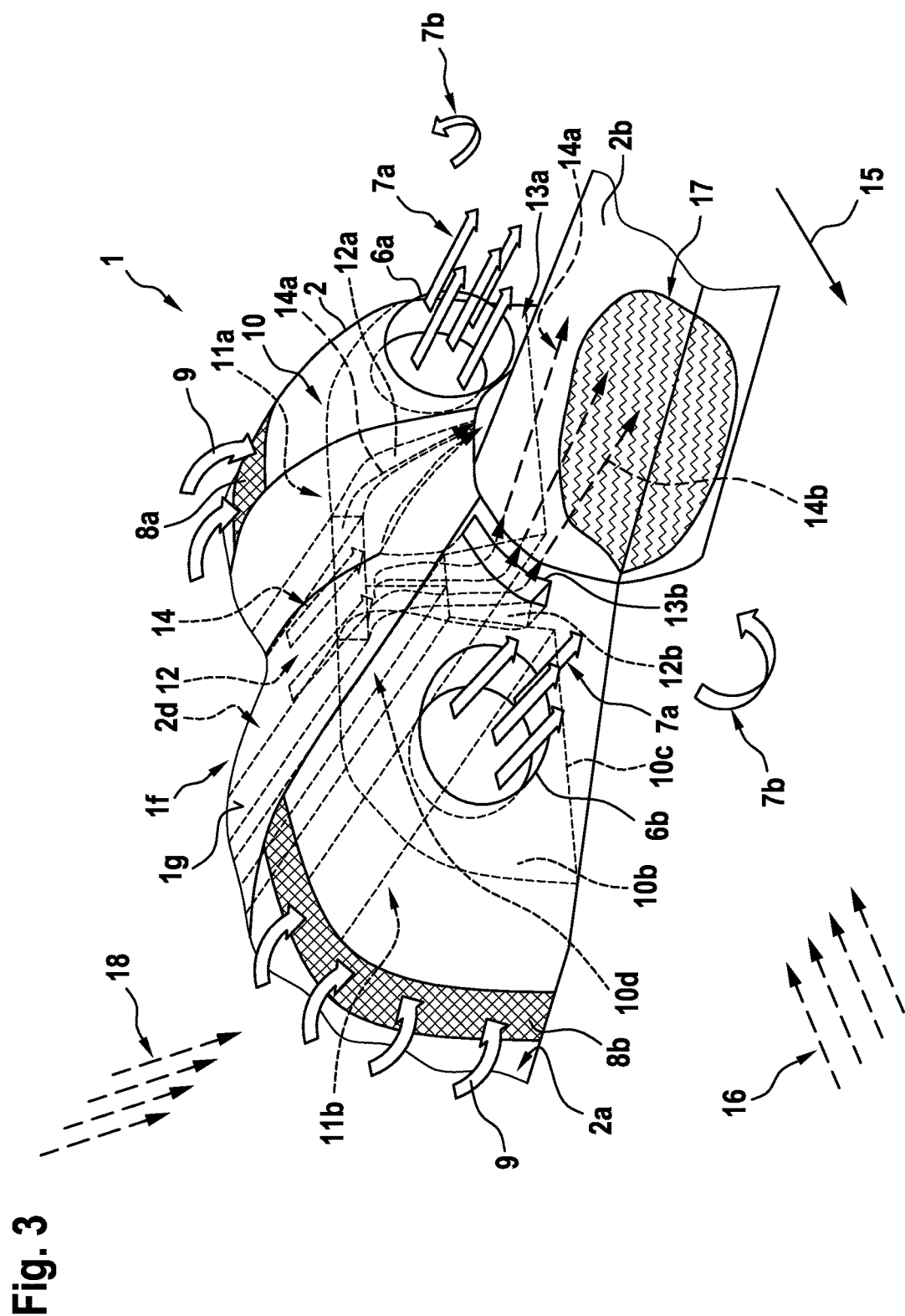
FIG. 3 shows a schematic perspective rear view of the drive system accommodating region with the firewall arrangement of FIG. 2.

FIG. 3 shows the upper deck region 1f of the helicopter 1 of FIG. 1 according to the configuration described above with reference to FIG. 2, for further illustrating the at least one firewall arrangement 10 that defines the first and second fire protection zones 11a, 11b inside the fuselage 2, and for further illustrating the independent ducting of the auxiliary hot air flow 14a with respect to the primary exhaust air flow 7a. Moreover, an exemplary arrangement of the first and second primary exhaust nozzles 6a, 6b and the auxiliary air exhaust nozzles 13a, 13b, as well as of the main engine air intakes 8a, 8b in different regions of the fuselage 2 that are spaced apart from each other is illustrated. Finally, also an exemplary main rotor downwash is illustrated with arrows 18, which also deflects the primary exhaust air flow 7a, but also the auxiliary hot air flow 14a, in operation.

Figure 4:
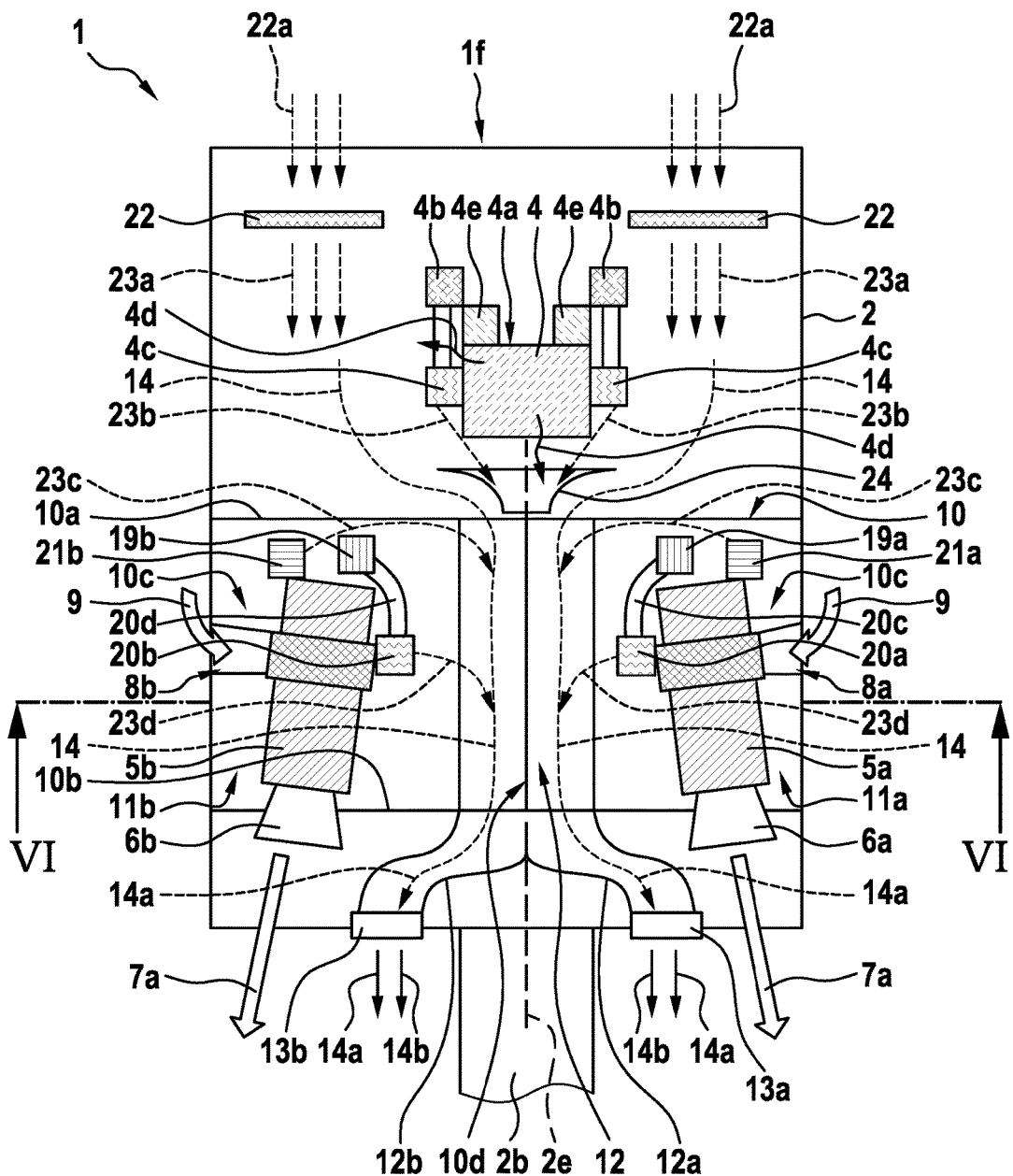
FIG. 4 shows a schematic view of the drive system accommodating region with the firewall arrangement of FIG. 2 and FIG. 3.

FIG. 4 shows the upper deck region 1f of the helicopter 1 of FIG. 1 according to the configuration described above with reference to FIG. 2 and FIG. 3, for schematically illustrating possible and preferred heat generating auxiliary devices provided in the inventive upper deck region 1f according to a preferred embodiment of the present invention. As described above, the upper deck region 1f preferably comprises the at least one firewall arrangement 10 defining the hot air duct 12 and the first and second fire protection zones 11a, 11b, wherein the first and second main engines 5a, 5b are arranged.

According to one aspect of the present invention, each one of the first and second main engines 5a, 5b has a preferably integrated starter/generator unit 21a, 21b, which needs fresh air for cooling down its integrated electrical engine in operation. Accordingly, each such starter/generator unit 21a, 21b will generate a hot air flow 23c in operation, which must be dissipated and is, therefore, transferred to the hot air duct 12. This is preferably achieved via an associated air duct, which is not shown for simplicity and clarity of the drawings. Furthermore, associated engine oil of each one of the first and second main engines 5a, 5b, which is heated in operation of the corresponding engine 5a, 5b, is cooled down by means of an associated heat exchanger 20a, 20b, which cools the associated engine oil using an engine mounted blower 19a, 19b. Preferably, the engine mounted blowers 19a, 19b transfer hot air to the associated heat exchangers 20a, 20b via suitable ducts 20c, 20d, which is then transferred to the hot air duct 12, as indicated with a dotted arrow 23d. This is preferably also achieved via an associated air duct, which is not shown for simplicity and clarity of the drawings.

Figure 5:
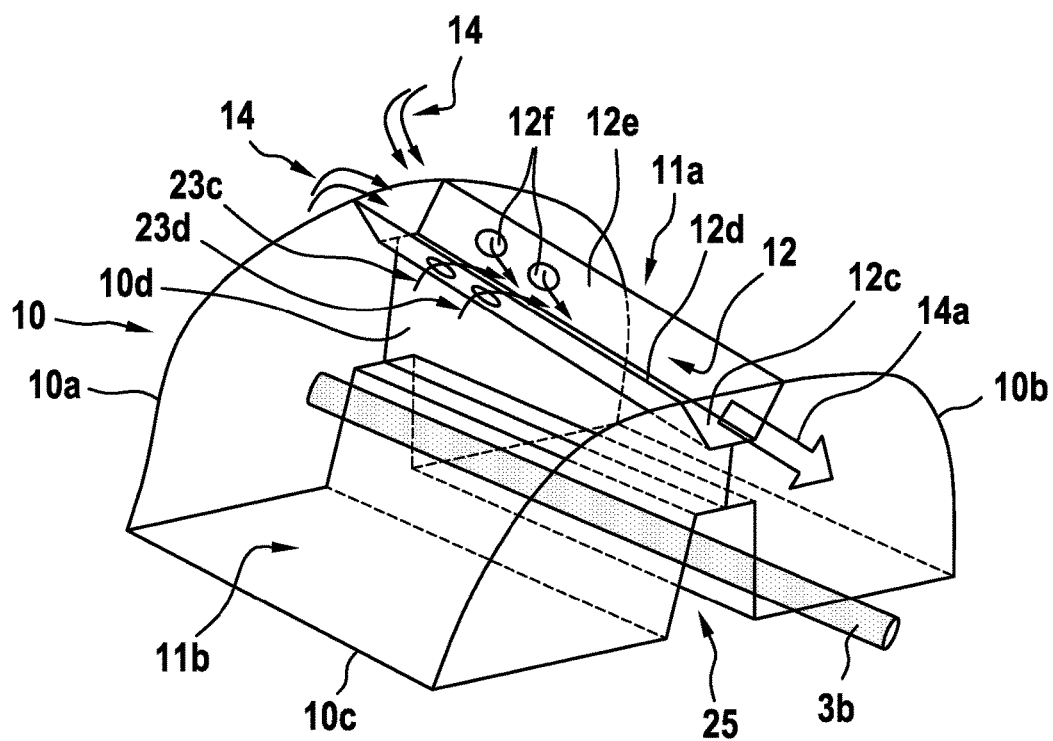
FIG. 5 shows a perspective view of the firewall arrangement of FIG. 1.

The hot air duct 12 further collects hot air coming from the region of the main gearbox 4, as well as from auxiliary gearboxes 4e that are adapted for propelling auxiliary devices that are required for operation of the helicopter 1 of FIG. 1, such as e.g. hydraulic pumps etc., as well as for propelling a tail rotor drive shaft (3b in FIG. 5). The main gearbox 4 preferably comprises internal parts that are accommodated within a metal housing 4a and not illustrated in greater detail for simplicity and clarity of the drawings. Via the metal housing 4a, heat 4d generated by the internal parts and/or internal oil of the main gearbox 4 is dissipated to the upper deck region 1f.

Preferably, at least the main gearbox 4 comprises associated blowers 4b as well as associated main gearbox oil heat exchangers 4c. The blowers 4b are adapted for creating an air flow through the heat exchangers 4c, which then, in combination with the blowers 4b, create a hot air flow 23b. The latter is preferably transferred to the hot air duct 12 by means of a suitable hot air ejector device 24, while the air flow from the blowers 4b is preferably transferred to the heat exchangers 4c via associated ducts, as illustrated.

The hot air ejector device 24 can advantageously be used for increasing a so-called "Venturi effect" occurring in operation. More specifically, since all mechanically driven blowers 4b, 19a, 19b, 21a, 21b, etc. are permanently driven by the main engines 5a, 5b, they will create a forced flow and an additional suction effect to surrounding ambient air in every region of the upper deck region 1f. This is commonly called "ejector effect" or "Venturi effect", which is an advantage if the helicopter 1 is in a flight condition with poor or no velocity. Thus, the present invention will enable an improved air flow in regions of the upper deck region 1f without dedicated forced cooling.

However, it should be noted that the above described heat generating auxiliary devices are only exemplary heat generating devices and that other heat generating devices may likewise be arranged within the upper deck region 1f. For instance, air conditioning refrigerant heat exchangers 22, which are also referred to as condensers, can be provided for cooling down the refrigerant of a given air conditioning system using external ram air 22a, thereby creating a hot air flow 23a.

FIG. 5 shows the firewall arrangement 10 with the hot air duct 12 of FIG. 1 to FIG. 4. As described above, the firewall arrangement 10 comprises the front, rear, lower and middle fire protection walls 10a, 10b, 10c, 10d, which define the first and second fire protection zones 11a, 11b.

According to one aspect of the present invention, the firewall arrangement 10 defines a component receiving compartment 25 between the first and second fire protection zones 11a, 11b. This component receiving compartment 25 is illustratively embodied by the lower fire protection wall 10c such that it traverses the firewall arrangement 10 in a gate-like manner.

Preferably, the component receiving compartment 25 is embodied for receiving at least partly a drive shaft 3b. By way of example, the drive shaft 3b is drivingly coupled to the counter-torque device 3 of FIG. 1, i.e. it drivingly couples the main gearbox 4 of FIG. 1 to the tail rotor 3a of FIG. 1. However, the component receiving compartment 25 may also receive other components together with or instead of the drive shaft 3b.

According to one aspect of the present invention, the component receiving compartment 25 is spaced apart from the hot air duct 12, which is illustratively at least approximately U-shaped. More specifically, the hot air duct 12 is preferably extended over an entire length of the firewall arrangement 10, seen in forward flight direction of the helicopter 1 of FIG. 1, and preferentially spaced apart from the component receiving compartment 25 by means of the middle fire protection wall 10d.

Preferably, the hot air duct 12 is defined by associated air duct walls 12c, 12d, 12e that separate, in operation, the auxiliary hot air 14 respectively the auxiliary hot air flow 14a from the first and second fire protection zones 11a, 11b. Illustratively, the wall 12c defines a lower air duct wall, the wall 12d defines a board side air duct wall and the wall 12e defines a starboard side air duct wall. The board side and starboard side air duct walls 12d, 12e are preferably provided with suitable inlet openings 12f, through which e.g. the hot air flow 23c from the starter/generator units 21a, 21b of FIG. 4 and the hot air flow 23d from the heat exchangers 20a, 20b of FIG. 4 enter the hot air duct 12.

It should be noted that the hot air duct 12 is shown as an integral part of the firewall arrangement 10, i.e. it is completely integrated into the firewall arrangement 10. Thus, no additional space is required for implementing the hot air duct 12.

Figure 6:
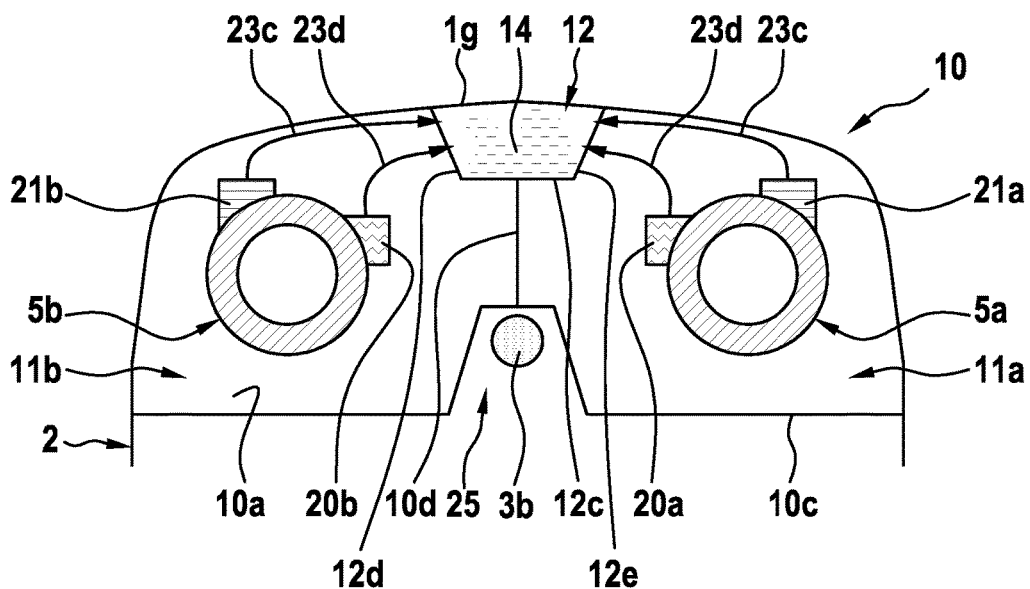
FIG. 6 shows a sectional view of the arrangement of FIG. 5 according to a first embodiment.

FIG. 6 shows the firewall arrangement 10 with the first and second fire protection zones 11a, 11b and the hot air duct 12 of FIG. 5, which is illustrated inside the fuselage 2 of FIG. 1 to FIG. 4 below of the outer surface 1g of the helicopter 1 of FIG. 1 to FIG. 4. The firewall arrangement 10 is shown with the main engines 5a, 5b that comprise the heat exchangers 20a, 20b and the starter/generator units 21a, 21b of FIG. 4, which are schematically represented for further illustrating the inventive separation of the auxiliary hot air 14 respectively the auxiliary hot air flow 14a in the hot air duct 12 from the first and second fire protection zones 11a, 11b. FIG. 6 also further illustrates the component receiving compartment 25 that accommodates at least partly the drive shaft 3b of FIG. 5, and that is spaced apart from the hot air duct 12 by means of the middle fire protection wall 10d.

Figure 7:
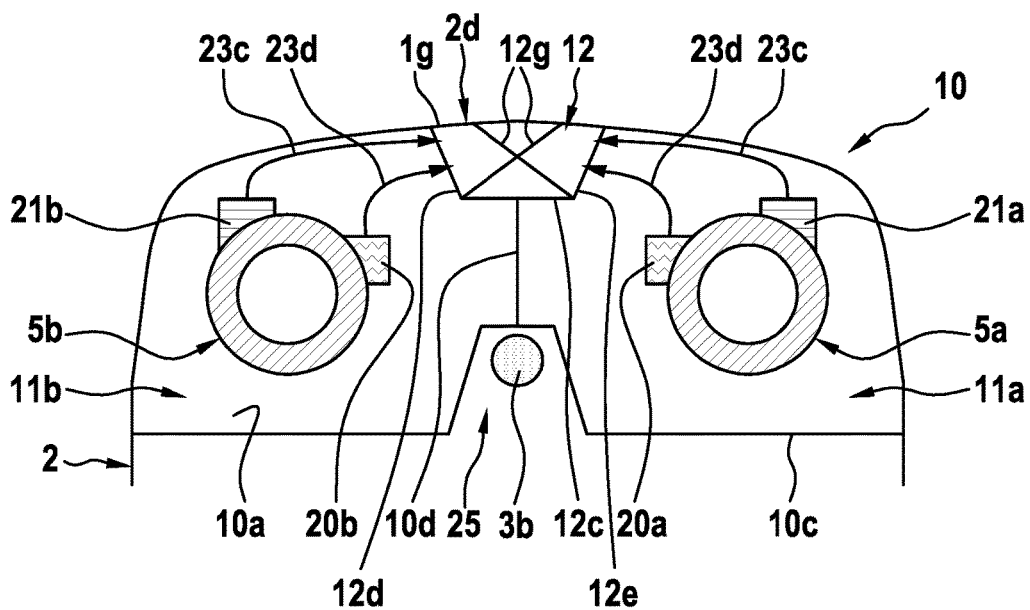
FIG. 7 shows a sectional view of the arrangement of FIG. 5 according to a second embodiment.

FIG. 7 shows the firewall arrangement 10 with the first and second fire protection zones 11a, 11b and the hot air duct 12 of FIG. 6. However, according to one aspect of the present invention, the hot air duct 12 now further comprises internal walls 12g that divide the hot air duct 12 into separate channels. By way of example, the internal walls 12g are shown in an X-shaped configuration, thereby dividing the hot air duct 12 into four separate channels. However, other arrangements and configurations of the internal walls 12g are also possible.

Figure 8:
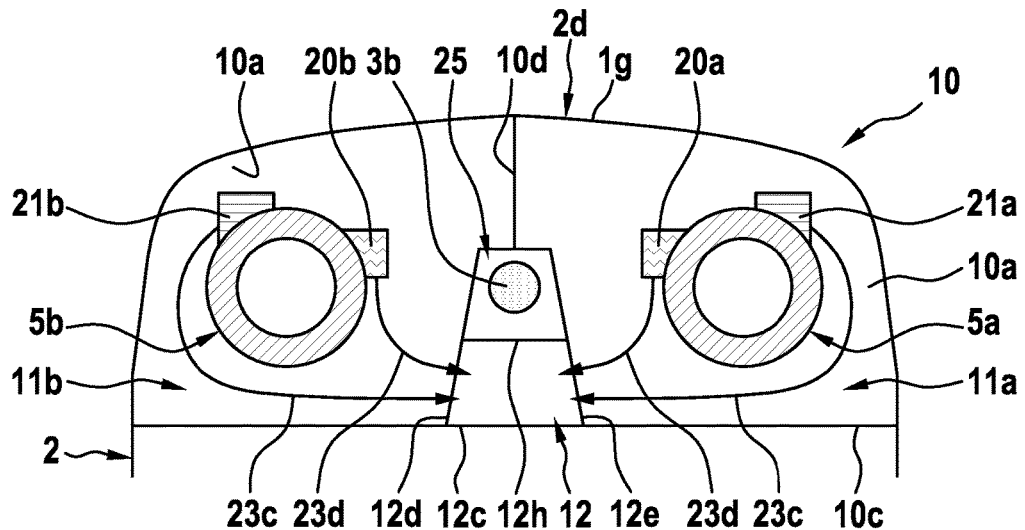
FIG. 8 shows a sectional view of the arrangement of FIG. 5 according to a third embodiment.

FIG. 8 shows the firewall arrangement 10 with the first and second fire protection zones 11a, 11b and the hot air duct 12 of FIG. 6. However, according to one aspect of the present invention, the hot air duct 12 is now located below, i.e. under the component receiving compartment 25 and provided with an upper air duct wall 12h that separates the hot air duct 12 from the component receiving compartment 25. In this configuration, the upper air duct wall 12h is required for protecting the drive shaft 3b of FIG. 5, which is illustratively arranged in the component receiving compartment 25, against an undesired thermal load.

Figure 9:
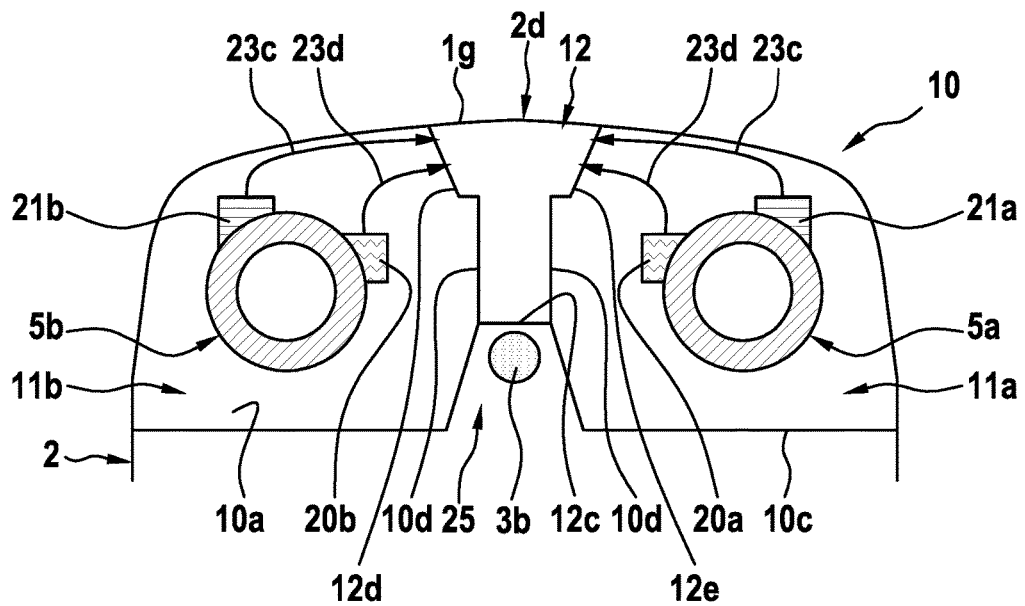
FIG. 9 shows a sectional view of the arrangement of FIG. 5 according to a fourth embodiment.

FIG. 9 shows the firewall arrangement 10 with the first and second fire protection zones 11a, 11b and the hot air duct 12 of FIG. 6. However, according to one aspect of the present invention, the hot air duct 12 is now at least approximately T-shaped and each one of the board side and starboard side air duct walls 12d, 12e thereof is extended towards the component receiving compartment 25 by means of the middle fire protection wall 10d, which is thus doubled. Accordingly, the lower air duct wall 12c now separates the hot air duct 12 from the component receiving compartment 25. In this configuration, the lower air duct wall 12c protects the drive shaft 3b of FIG. 5, which is illustratively arranged in the component receiving compartment 25, against an undesired thermal load.

Figure 10:
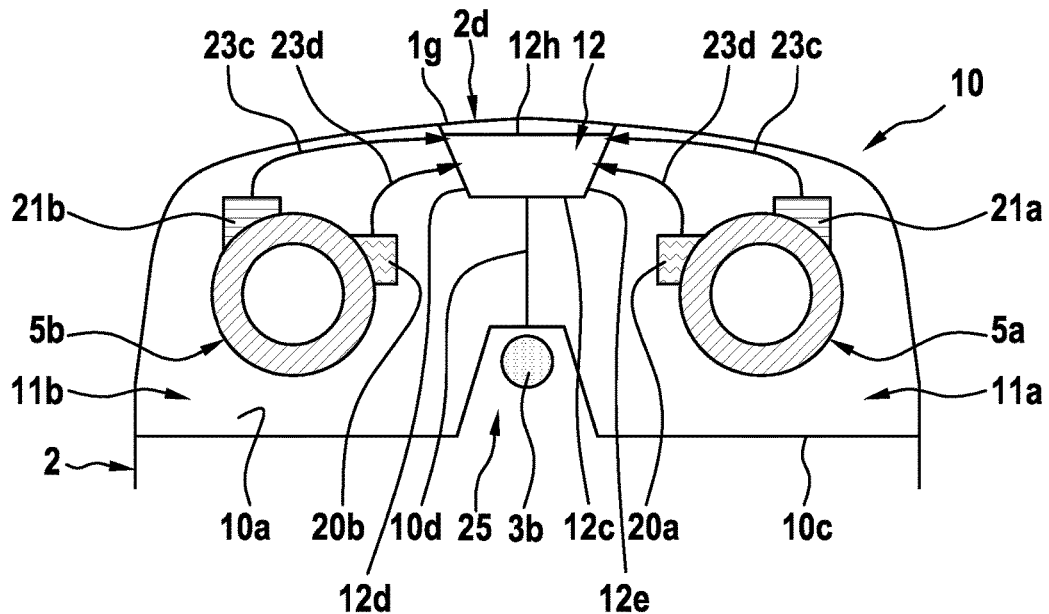
FIG. 10 shows a sectional view of the arrangement of FIG. 5 according to a fifth embodiment.

FIG. 10 shows the firewall arrangement 10 with the first and second fire protection zones 11a, 11b and the hot air duct 12 of FIG. 6. However, according to one aspect of the present invention, the hot air duct 12 is now provided with the upper air duct wall 12h of FIG. 8 such that the hot air flow 23c from the starter/generator units 21a, 21b of FIG. 4 and the hot air flow 23d from the heat exchangers 20a, 20b of FIG. 4 that enter the hot air duct 12 according to FIG. 5 is separated from the outer surface 1g of the helicopter 1 of FIG. 1 to FIG. 4.

Figure 11:
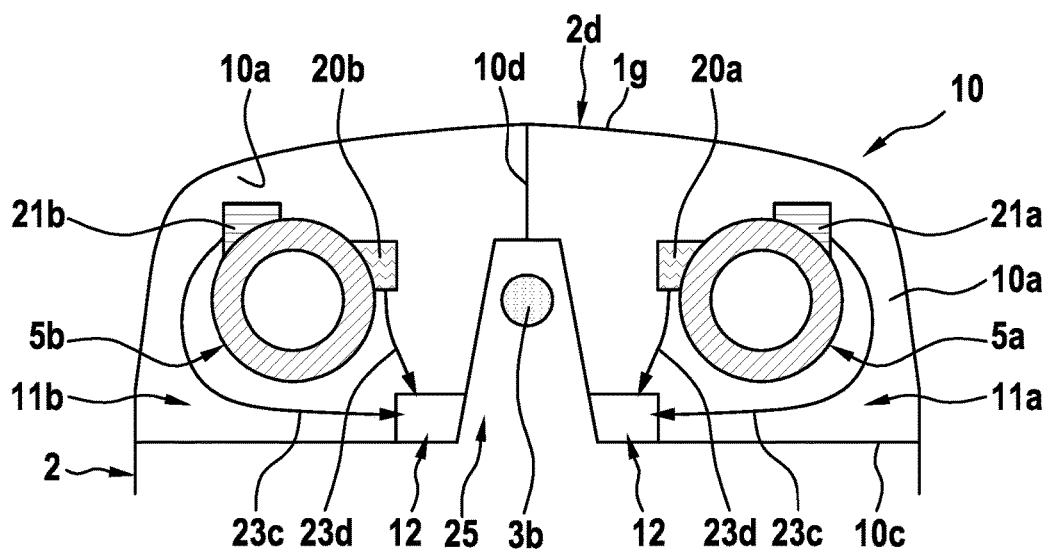
FIG. 11 shows a sectional view of the arrangement of FIG. 5 according to a sixth embodiment.

FIG. 11 shows the firewall arrangement 10 with the first and second fire protection zones 11a, 11b and the hot air duct 12 of FIG. 6. However, according to one aspect of the present invention, the hot air duct 12 is now implemented as a first air duct 12 that is arranged in the first fire protection zone 11a and a second air duct 12 that is arranged in the second fire protection zone 11b. By way of example only, the first and second air ducts 12 are arranged on the lower fire protection wall 10c, each one laterally to the component receiving compartment 25.

Figure 12:
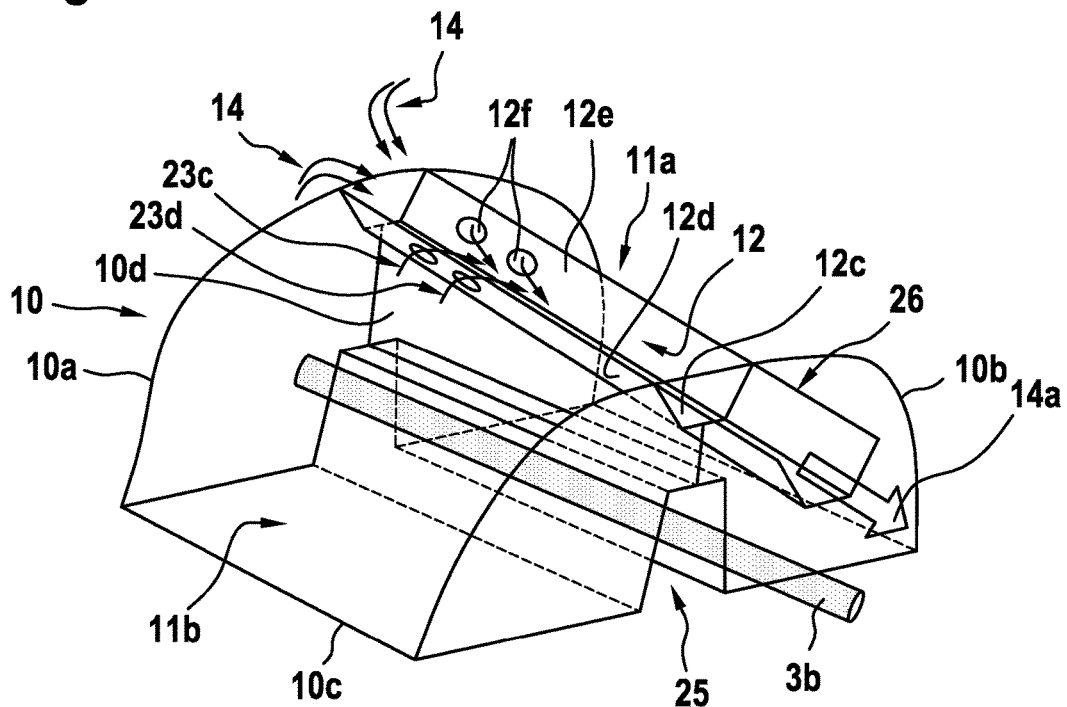
FIG. 12 shows a sectional view of the arrangement of FIG. 5 according to a seventh embodiment.

FIG. 12 shows the firewall arrangement 10 with the first and second fire protection zones 11a, 11b and the hot air duct 12 of FIG. 5. However, according to one aspect of the present invention, the hot air duct 12 is now equipped with an air duct extension 26 that is adapted to extend the hot air duct 12 such that the auxiliary hot air flow 14a can be transferred to a predetermined location for exhausting. The air duct extension 26 can e.g. be used to implement at least partly the first and second additional hot air ducts 12a, 12b of FIG. 2 and FIG. 3.

Figure 13:
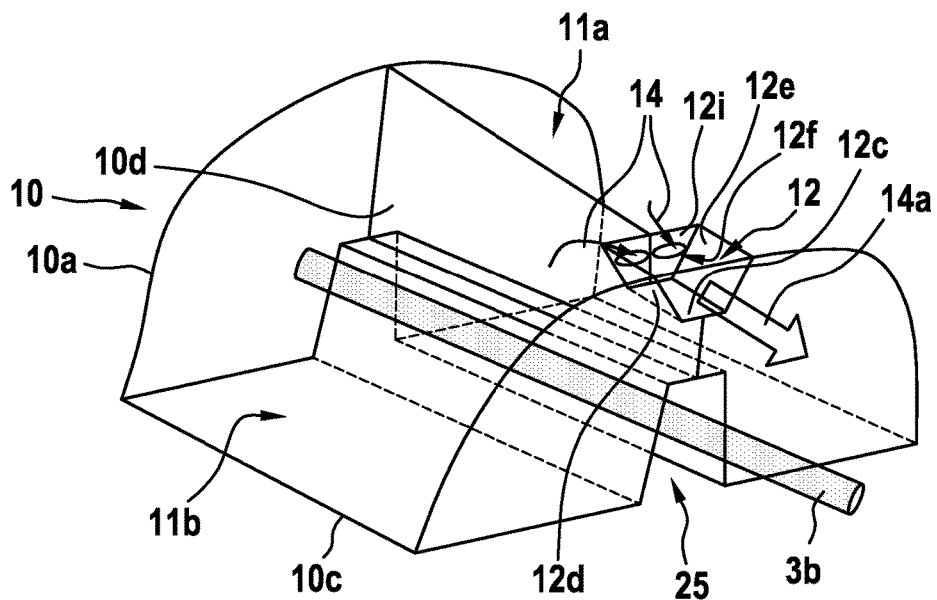
FIG. 13 shows a sectional view of the arrangement of FIG. 5 according to an eighth embodiment.

FIG. 13 shows the firewall arrangement 10 with the first and second fire protection zones 11a, 11b and the hot air duct 12 of FIG. 5. However, according to one aspect of the present invention, the hot air duct 12 is now embodied in the form of a shell, and not extended over the entire length of the firewall arrangement 10, as described above with reference to FIG. 5. Accordingly, the hot air duct 12 is delimited in its longitudinal extension by an exemplary front air duct wall 12i, wherein the inlet openings 12f are embodied, by way of example.

Figure 14:
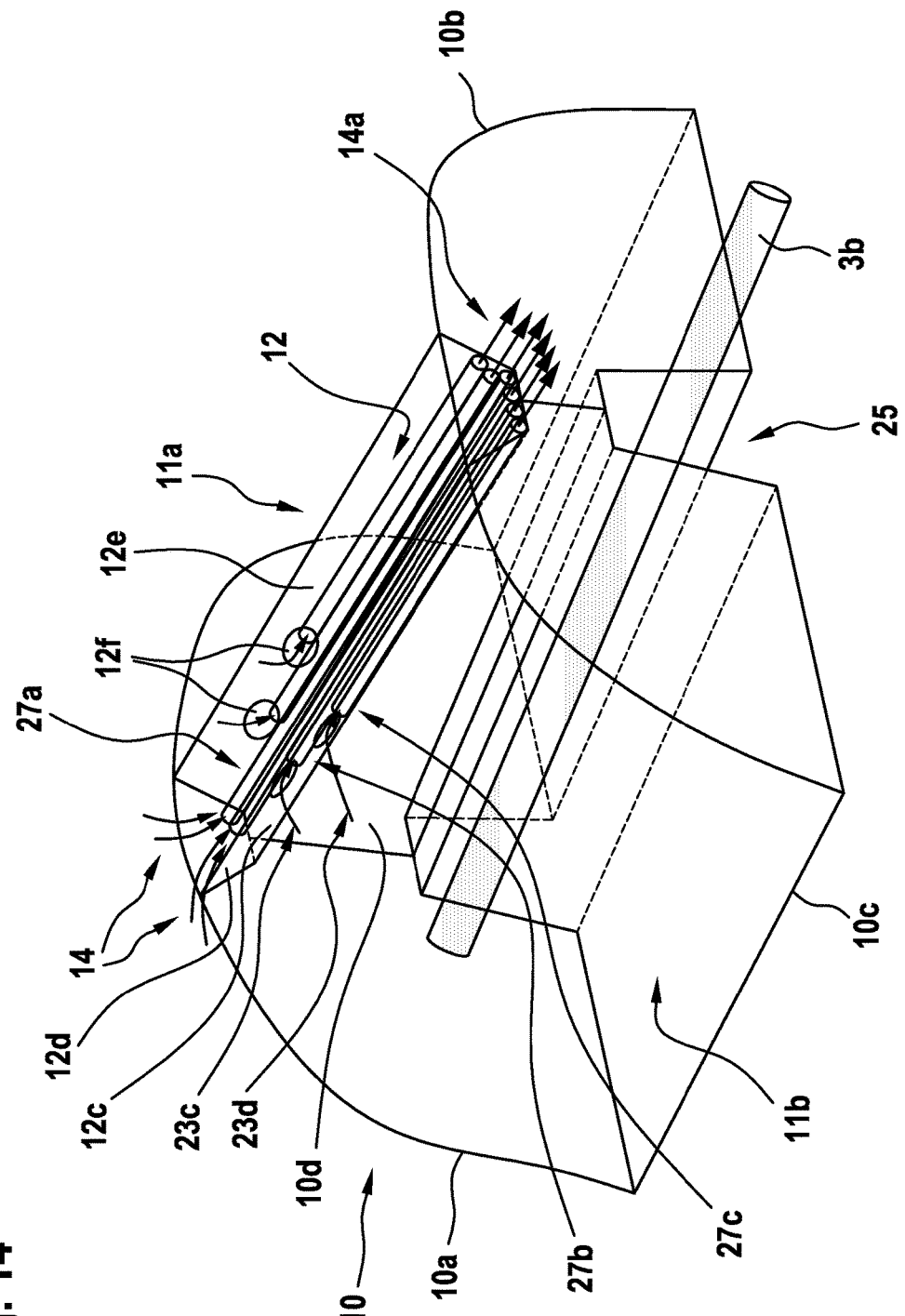
FIG. 14 shows a sectional view of the arrangement of FIG. 5 according to a ninth embodiment.

FIG. 14 shows the firewall arrangement 10 with the first and second fire protection zones 11a, 11b and the hot air duct 12 of FIG. 5. However, according to one aspect of the present invention, the hot air duct 12 now accommodates at least one and illustratively six hot-air hoses 27a, 27b, 27c for ducting the hot air 14 respectively the hot air flow 14a. By way of example, the hot-air hoses 27b are provided for ducting the hot air flow 23c from the starter/generator units 21a, 21b of FIG. 4 in the hot air duct 12 and the hot-air hoses 27c are provided for ducting the hot air flow 23d from the heat exchangers 20a, 20b of FIG. 4 in the hot air duct 12.

Figure 15:
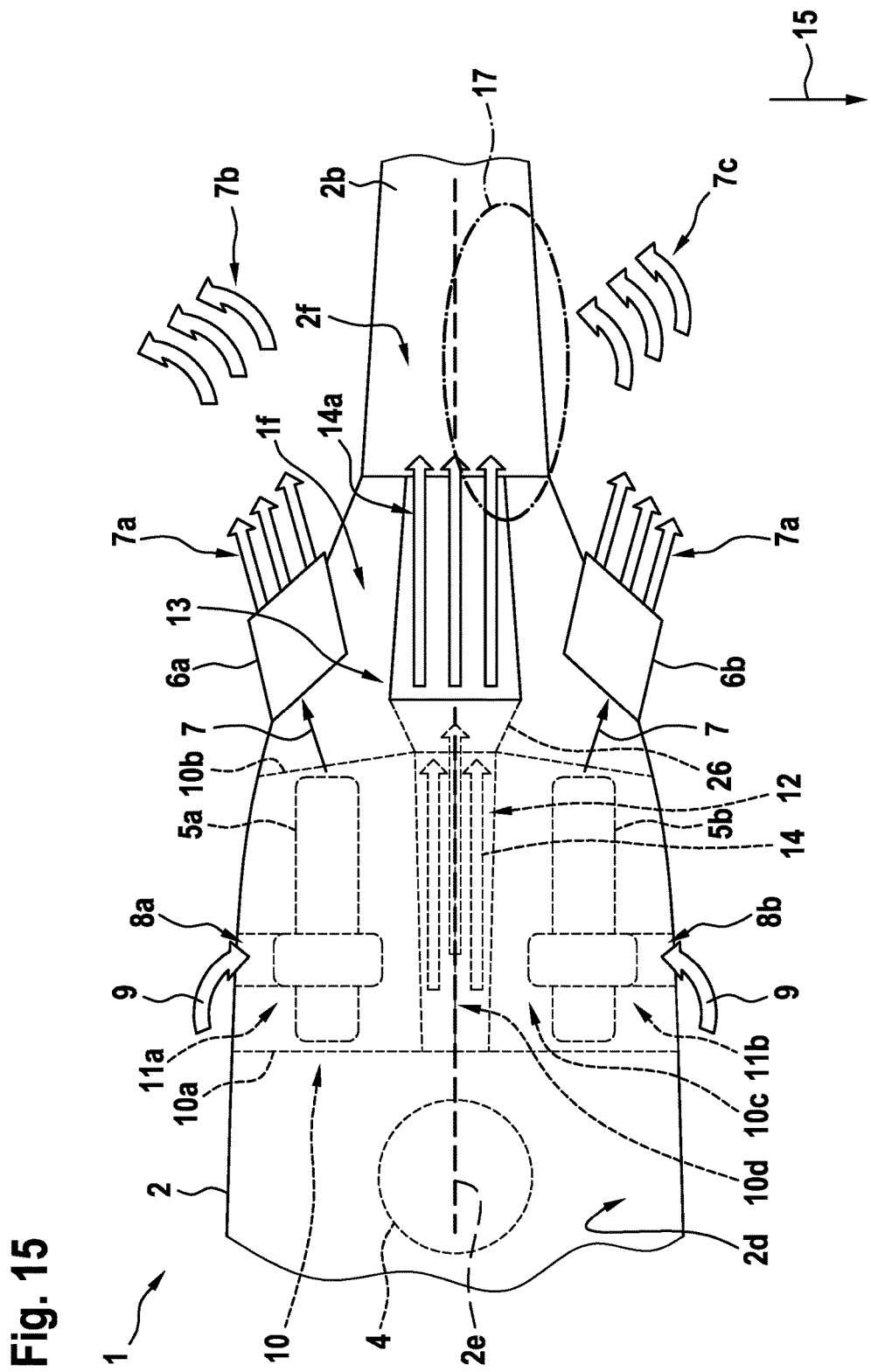
FIG. 15 shows a schematic top view of the arrangement of FIG. 2 according to an alternative embodiment.

FIG. 15 shows the configuration of FIG. 2 with a section of the helicopter 1 of FIG. 1 having the first and second main engines 5a, 5b with the associated first and second primary exhaust nozzles 6a, 6b, and having the fuselage 2 that defines the upper deck region 1f, which comprises the at least one firewall arrangement 10, and the tail boom 2b, seen in plan view on the upper fuselage side 2d, i.e. on an upper side 2f of the tail boom 2b. However, in contrast to the configuration of FIG. 2, the firewall arrangement 10 is now provided with the hot air duct 12 having the air duct extension 26 of FIG. 12, which is provided with a single auxiliary air exhaust nozzle 13 instead of the two auxiliary air exhaust nozzles 13a, 13b of FIG. 2.

Preferably, the single auxiliary air exhaust nozzle 13 is at least approximately arranged on the vertical mid plane 2e of the helicopter 1, preferentially centrically between the first and second primary exhaust nozzles 6a, 6b. Furthermore, the single auxiliary air exhaust nozzle 13 preferably expels the hot air flow 14a in the direction of the upper side 2f of the tail boom 2b.

Figure 16:
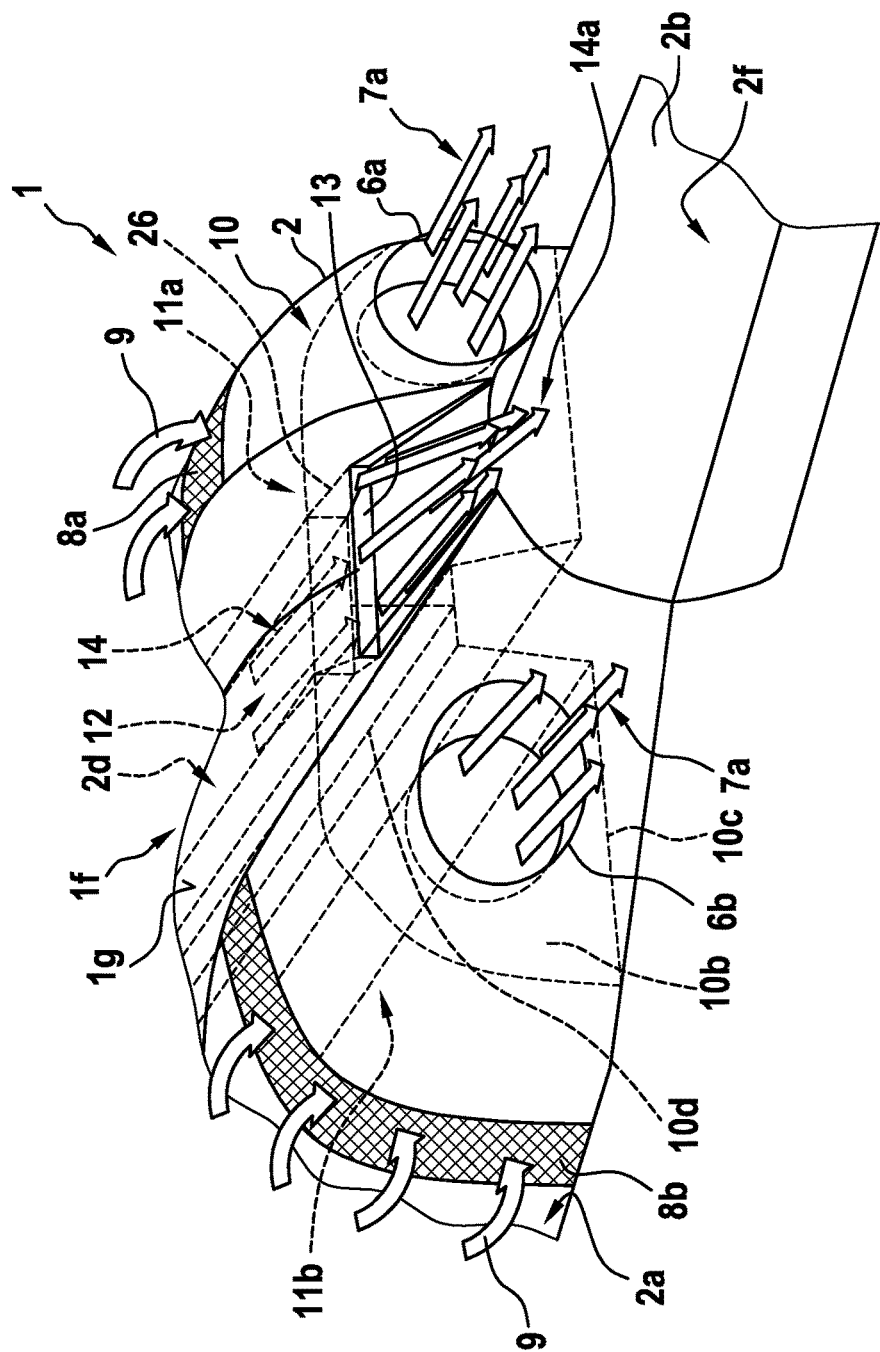
FIG. 16 shows a schematic perspective rear view of the arrangement of FIG. 15.

FIG. 16 shows the upper deck region 1f of the helicopter 1 of FIG. 1 according to the configuration described above with reference to FIG. 15, for further illustrating the hot air flow 14a that is expelled in the direction of the upper side 2f of the tail boom 2b.

Figure 17:
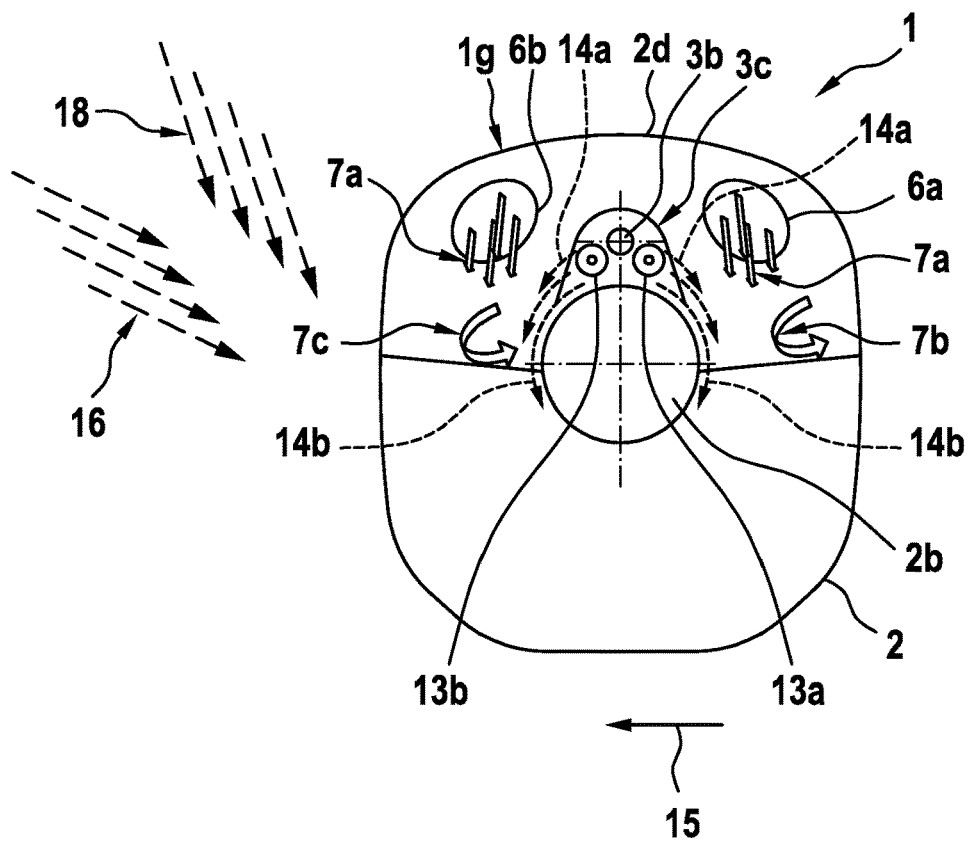
FIG. 17 shows a schematic view of the arrangements of FIG. 2 and FIG. 15 according to a variant.

FIG. 17 shows a schematic rear view of the helicopter 1 of FIG. 1 with the fuselage 2 and the tail boom 2b. The latter is preferably embodied for carrying the drive shaft 3b of FIG. 5, which is preferentially covered by an associated drive shaft fairing 3c.

According to one aspect of the present invention, the hot air flow 14a is now expelled through the tail boom 2b in operation. More specifically, the hot air flow 14a is preferably expelled in a region between the drive shaft fairing 3c and the tail boom 2b.

Figure 18:
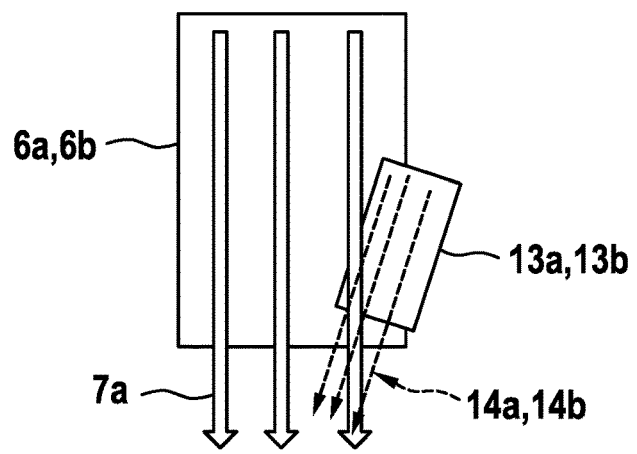
FIG. 18 shows a schematic view of integrated primary and secondary exhaust nozzles according to one embodiment of the present invention.

FIG. 18 shows the primary exhaust nozzles 6a, 6b of one of the preceding figures, which are provided for expelling the primary exhaust air flow 7a. According to one aspect of the present invention, the auxiliary air exhaust nozzles 13a, 13b are now at least partly integrated into the corresponding primary exhaust nozzles 6a, 6b.

It should be noted that the above description essentially explains different configurations of firewall arrangements, wherein a given configuration mainly depends on form and shape of the hot air duct 12 and/or arrangement of the exhaust nozzles 6, 13. However, it should be noted that the different configurations can easily be combined and/or modified in an application-specific manner. Therefore, all combinations of the above different configurations or elements thereof are likewise contemplated as being part of the present invention.

REFERENCE LIST 1 aircraft
1a main rotor
1b, 1c rotor blades
1d rotor head
1e rotor shaft
1f drive system accommodating region
1g aircraft outer surface
2 fuselage
2a fuselage interior region
2b tail boom
2c fin
2d upper fuselage side
2e fuselage vertical mid plane
2f tail boom upper side
3 counter-torque device
3a tail rotor
3b tail rotor drive shaft
3c drive shaft fairing
4 main gearbox
4a main gearbox metal housing
4b main gearbox blowers
4c main gearbox oil heat exchanger
4d main gearbox heat dissipation
4e auxiliary gearboxes
5 main engines
5a first main engine
5b second main engine
6 primary air exhausts
6a first primary air exhaust nozzle
6b second primary air exhaust nozzle
6c primary air exhaust mid axis
6d primary air exhaust inclination angle
7 primary hot air
7a primary exhaust air flow
7b, 7c deflected primary exhaust air flows
8 main engine air intake
8a first main engine air intake
8b second main engine air intake
9 main engines intake air flow
10 firewall arrangement
10a front fire protection wall
10b rear fire protection wall
10c lower fire protection wall
10d middle fire protection wall
11 fire protection zones
11a first fire protection zone
11b second fire protection zone
12 firewall integrated air duct
12a first additional air duct
12b second additional air duct
12c lower air duct wall
12d board side air duct wall
12e starboard side air duct wall
12f firewall integrated air duct inlet openings
12g firewall integrated air duct internal walls
12h upper air duct wall
12i front air duct wall
13 auxiliary air exhausts
13a first auxiliary air exhaust nozzle
13b second auxiliary air exhaust nozzle
14 auxiliary hot air
14a auxiliary exhaust air flows
14b tail boom protective air flow
15 sideward flight direction
16 surrounding air flow
17 tail boom heated zone
18 main rotor downwash
19a, 19b main engine blowers
20a, 20b main engine oil heat exchangers
20c, 20d main engine oil heat exchanger air ducts
21a, 21b main engine starter/generator units
22 air conditioning refrigerant heat exchangers
22a external ram air
23a air conditioning refrigerant heat exchangers hot air
23b main gearbox oil heat exchangers hot air
23c main engine starter/generator units hot air
23d main engine oil heat exchangers hot air
24 hot air ejector device
25 component receiving compartment
26 firewall integrated air duct extension
27a, 27b, 27c hot-air hoses

What is claimed is:

1. A rotary-wing aircraft comprising:
a fuselage that defines at least an interior region and a drive system accommodating region, the drive system accommodating region disposed inside the fuselage and comprising at least one fire protection zone that is defined by at least one associated firewall arrangement comprising a plurality of interconnected fire protection walls,
at least one engine disposed within the at least one fire protection zone within the at least one associated firewall arrangement such that the at least one associated firewall arrangement defines a fire-resistant separation between the at least one engine and the interior region of the fuselage,
at least one heat generating auxiliary device distinct from the at least one engine and generating a hot air flow;
at least one auxiliary exhaust nozzle;
the at least one associated firewall arrangement comprising at least one air duct forming at least part of the at least one associated firewall arrangement and arranged between, and in fluid communication with, the at least one heat generating auxiliary device and the at least one auxiliary exhaust nozzle so that the hot air flow that is generated by the at least one heat generating auxiliary device in operation of the aircraft is ducted through the at least one air duct separately from air carrying heat generated by the operation of the at least one engine, wherein the at least one associated firewall arrangement includes the at least one air duct such that the at least one air duct is integral with the at least one associated firewall arrangement, the plurality of interconnected fire protection walls comprising a front fire protection wall, a rear fire protection wall, and a lower fire protection wall.

2. The rotary-wing aircraft according to claim 1, wherein the heat generating auxiliary device comprises at least one of: a gearbox, at least one heat exchanger, and a unit that generates hot air flow during operation of the aircraft.

3. The rotary-wing aircraft according to claim 1, wherein the at least one engine is an air breathing propulsion engine and the heat generated in operation of the air breathing propulsion engine is a primary hot air flow, the primary hot air flow ducted separately from the hot air flow ducted through the air duct.

4. The rotary-wing aircraft according to claim 1, wherein the at least one associated firewall arrangement includes a middle fire protection wall dividing the at least one associated firewall arrangement into a first fire protection zone accommodating a first engine and a second fire protection zone accommodating a second engine with a space extending between the first and second fire protection zones, the at least one air duct disposed and extending between the first and second fire protection zones in the space extending between the first and second fire protection zones.

5. The rotary-wing aircraft according to claim 4, wherein the at least one associated firewall arrangement defines a component receiving compartment between the first and second fire protection zones.

6. The rotary-wing aircraft according to claim 5, wherein the drive system accommodating region defines an upper deck region of the fuselage, the upper deck region disposed inside the fuselage adjacent to an upper fuselage side.

7. The rotary-wing aircraft according to claim 5, wherein the aircraft has at least one counter-torque device, the counter-torque device drivingly coupled to an associated drive shaft, the associated drive shaft is at least partly received in the component receiving compartment.

8. The rotary-wing aircraft according to claim 7, wherein the fuselage defines a tail boom, the fuselage also defining at least one primary exhaust nozzle in fluid communication with the at least one engine for expelling a primary hot air flow generated by the at least one engine in operation, the at least one air duct provided with at least one auxiliary exhaust nozzle in fluid communication with the at least one heat generating auxiliary device for expelling the hot air flow in operation, the at least one auxiliary exhaust nozzle at least partly arranged in parallel between a longitudinal axis of the aircraft, the at least one primary exhaust nozzle and the tail boom.

9. The rotary-wing aircraft according to claim 7, wherein the fuselage defines a tail boom, wherein the hot air flow is expelled through the tail boom in operation of the rotary-wing aircraft.

10. The rotary-wing aircraft according to claim 1, wherein the at least one air duct is provided with at least one exhaust nozzle through which the hot air flow is expelled in operation, the at least one exhaust nozzle adapted for directing an expelled hot air flow at least partly alongside the fuselage.

11. The rotary-wing aircraft according to claim 1, wherein at least one primary exhaust nozzle is provided for expelling a primary hot air flow generated by the at least one engine in operation, wherein the at least one air duct is provided with at least one auxiliary exhaust nozzle for expelling the hot air flow in operation, the at least one auxiliary exhaust nozzle is at least partly integrated into the at least one primary exhaust nozzle.

12. The rotary-wing aircraft according to claim 1, wherein the at least one air duct accommodates at least one hot-air hose for ducting the hot air flow.

13. The rotary-wing aircraft according to claim 1, wherein the at least one air duct comprises thermally insulated material.

14. The rotary-wing aircraft according to claim 1, wherein the at least one associated firewall arrangement defines a first fire protection zone accommodating a first engine and a second fire protection zone accommodating a second engine, the at least one air duct comprising a first air duct arranged in the first fire protection zone and a second air duct arranged in the second fire protection zone.

15. The rotary-wing aircraft according to claim 1, wherein the at least one air duct is defined by associated air duct walls that separate, in operation, the hot air flow from the at least one fire protection zone.

16. The rotary-wing aircraft according to claim 15, wherein the associated air duct walls comprise at least one air duct wall that separates, in operation, the hot air flow from the fuselage.

17. A rotary-wing aircraft comprising:
a fuselage comprising an interior region and a drive system accommodating region, the drive system accommodating region comprising a fire protection zone having a firewall arrangement comprising a plurality of interconnected fire protection walls made of thermally insulated material,
an engine disposed within the fire protection zone within the firewall arrangement, the firewall arrangement defining a fire-resistant separation between the engine and the interior region of the fuselage, a heat generating auxiliary device distinct from the engine, the heat generating auxiliary device capable of generating a hot air flow;

an auxiliary exhaust nozzle; and the firewall arrangement comprising an air duct made of thermally insulated material disposed between, and in fluid communication with, the heat generating auxiliary device and the auxiliary exhaust nozzle so that hot air generated by the heat generating auxiliary device in operation of the aircraft is ducted through the air duct separately from air carrying heat generated by the operation of the engine, wherein the firewall arrangement includes the air duct such that the air duct is integral with the firewall arrangement, the plurality of interconnected fire protection walls comprising a front fire protection wall, a rear fire protection wall, and a lower fire protection wall.

18. The rotary-wing aircraft according to claim 17, further comprising a counter-torque device, the counter-torque device drivingly coupled to an associated drive shaft, the associated drive shaft at least partly received in a component receiving compartment, wherein the fuselage defines a tail boom, the fuselage also defining at least one primary exhaust nozzle for expelling a primary hot air flow generated by engine in operation, the air duct provided with at least one auxiliary exhaust nozzle for expelling the hot air flow in operation, the at least one auxiliary exhaust nozzle is at least partly arranged in parallel between a longitudinal axis of the aircraft, the at least one primary exhaust nozzle and the tail boom.

19. A rotary-wing aircraft comprising: a fuselage defining an interior region and a drive system accommodating region, the drive system accommodating region disposed inside the fuselage and comprising a fire protection zone defined by an associated firewall arrangement comprising a plurality of interconnected fire protection walls, two engines disposed in a spaced arrangement within the fire protection zone within the associated firewall arrangement such that the associated firewall arrangement defines a fire-resistant separation between the engines and the interior region of the fuselage, a heat generating auxiliary device generating a hot air flow distinct from the engines;

an auxiliary exhaust nozzle;

the associated firewall arrangement comprising an air duct extending between the engines and within the associated firewall arrangement, the air duct extending between the heat generating auxiliary device and the auxiliary exhaust nozzle so that the hot air flow generated by the heat generating auxiliary device in operation of the aircraft is ducted through the air duct; and two spaced apart primary exhaust nozzles, each of the primary exhaust nozzles is in communication with a primary exhaust airflow carrying heat generated by a respective one of the engines, the air duct is separate from the primary exhaust nozzles so that the hot air flow generated by the heat-generating auxiliary device is ducted separately from the primary exhaust air flows generated by the engines, wherein the associated firewall arrangement includes the air duct such that the air duct is integral with the at least one associated firewall arrangement, the plurality of interconnected fire protection walls comprising a front fire protection wall, a rear fire protection wall, and a lower fire protection wall.

* * * * *